US012710712B2

(12) United States Patent
Washio et al.

(10) Patent No.: US 12,710,712 B2
(45) Date of Patent: Aug. 18, 2026

(54) IMAGE FORMING APPARATUS

(71) Applicant: BROTHER KOGYO KABUSHIKI KAISHA, Nagoya (JP)

(72) Inventors: Takaya Washio, Nagoya (JP); Kazuya Kamikawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 19/088,285

(22) Filed: Mar. 24, 2025

(65) Prior Publication Data

US 2025/0306508 A1 Oct. 2, 2025

(30) Foreign Application Priority Data

Mar. 29, 2024 (JP) ................................ 2024-055853

(51) Int. Cl.

*G03G 15/20* (2006.01)
*G03G 21/16* (2006.01)
*G03G 21/18* (2006.01)

(52) U.S. Cl.

CPC ..... *G03G 15/2028* (2013.01); *G03G 15/2064* (2013.01); *G03G 21/1647* (2013.01); *G03G 21/1652* (2013.01); *G03G 21/1814* (2013.01); *G03G 21/1871* (2013.01); *G03G 2221/166* (2013.01)

(58) Field of Classification Search

CPC ........... G03G 15/2028; G03G 15/2064; G03G 21/1647; G03G 21/1652; G03G 21/1814; G03G 21/1817; G03G 2221/166

See application file for complete search history.

(56) References Cited

U.S. PATENT DOCUMENTS

2003/0147678 A1* 8/2003 Ozawa ............... G03G 15/0194 399/302
2004/0033092 A1* 2/2004 Aruga ................ G03G 15/2064 399/329
2008/0304854 A1* 12/2008 Watanabe .......... G03G 15/2039 399/92
2011/0158676 A1* 6/2011 Nakaya .................. G03G 21/20 399/94

(Continued)

FOREIGN PATENT DOCUMENTS

JP 2011-252944 A 12/2011
JP 2012-78424 A 4/2012
JP 2016-206260 A 12/2016

*Primary Examiner* — Sevan A Aydin
(74) *Attorney, Agent, or Firm* — Merchant & Gould P.C.

(57) ABSTRACT

An image forming apparatus includes a main housing, a process unit configured to form a toner image on a sheet that is conveyed through the process unit and comprising a cartridge containing toner, a fixing device located downstream of the process unit in a direction of conveyance of the sheet, and an elastically deformable film. The fixing device includes a rotatable heating body and a rotatable pressure body. The rotatable heating body and the rotatable pressure body nip and apply heat and pressure to the sheet on which the toner image is formed to fix the toner image on the sheet. An upper end of the film is attached to the main housing at a position between the fixing device and the process unit. The film extends downward from a position above an area through which the sheet is conveyed toward the area through which the sheet is conveyed.

14 Claims, 17 Drawing Sheets

(56) References Cited

U.S. PATENT DOCUMENTS

| | | | | |
|---|---|---|---|---|
| 2011/0188894 | A1 * | 8/2011 | Mihara | G03G 15/08 399/256 |
| 2012/0087693 | A1 | 4/2012 | Yamaguchi et al. | |
| 2014/0239575 | A1 * | 8/2014 | Hasegawa | B65H 29/56 271/125 |
| 2016/0124357 | A1 * | 5/2016 | Ujiie | G03G 15/2025 399/327 |

* cited by examiner

IMAGE FORMING APPARATUS

REFERENCE TO RELATED APPLICATIONS

This application claims priority from Japanese Patent Application No. 2024-055853 filed on Mar. 29, 2024. The entire contents of the priority application are incorporated herein by reference.

BACKGROUND ART

An image forming apparatus including an insulation wall made of plastic is known in the art. The insulation wall is placed between the fixing device and the process cartridge to restrain heat from the fixing device from affecting the cartridge.

SUMMARY

When insulation walls made of plastic are disposed in an image forming apparatus, it is necessary to provide a certain distance between the insulation wall and the fixing device to restrain the fixing device from interfering with the insulation wall, for example, when the fixing device moves upon replacement of the fixing device. Further, even if the fixing device itself is not movable, if a component of the fixing device is movable, a certain distance is necessary between the insulation wall and the fixing device to restrain interference between the fixing device and the insulation wall. As a result, the image forming apparatus may become larger in size.

It would be desirable to restrain an image forming apparatus from increasing in size and to provide an image forming apparatus in which a fixing device and a cartridge are partitioned.

In one aspect, an image forming apparatus according to the present disclosure comprises a main housing, a process unit, a fixing device, and a film.

The process unit forms a toner image on a sheet that is conveyed through the process unit. The process unit comprises a cartridge containing toner.

The fixing device is located downstream of the process unit in a direction of conveyance of the sheet. The fixing device comprises a rotatable heating body and a rotatable pressure body. The rotatable heating body and the rotatable pressure body nip and apply heat and pressure to the sheet on which the toner image is formed to fix the toner image on the sheet.

The film is a film having an upper end attached to the main housing at a position between the fixing device and the process unit. The film extends downward from a position above an area through which the sheet is conveyed. The film is elastically deformable.

Since the film is elastically deformable and the fixing device can be placed in the proper position by the film deforming upon contact of the fixing device and the film, there is no need to unnecessarily increase the distance between the fixing device and the film.

The film may extend further outward of an area through which a sheet having a maximum size on which an image is formable in the image forming apparatus is conveyed, in a width direction perpendicular to the direction of conveyance of the sheet.

The fixing device may further comprise a heating source extending in a width direction perpendicular to the direction of conveyance of the sheet. The film may extend further outward of an area in which the heating source is located, in the width direction.

The fixing device may further comprise a shutter and an opening through which the sheet enters the fixing device. The shutter is configured to move between a closed state in which the opening is covered and an open state in which the opening is uncovered. A bottom edge of the film may be located below a top edge of the shutter in the open state and above a bottom edge of the shutter in the open state.

The shutter may be configured to rotate when moving from the closed state to the open state. The shutter may contact the film and push the film toward an upstream side in the direction of conveyance of the sheet when rotating from the closed state to the open state Since the film is deformed by the shutter, the image forming apparatus can be reduced in size in the direction of conveyance of the sheet compared to an alternative configuration in which the film and the shutter are arranged apart from each other.

The rotatable heating body may comprise a roller that is configured to contact the sheet. The film may extend further outward, of an area in which the roller is located, in a width direction perpendicular to the direction of conveyance of the sheet.

The process unit may comprise a drawer in which the cartridge is installable into and removable from. The drawer may be installable into and removable from the main housing.

The main housing may comprise a shaft configured to be engaged with the drawer.

A bottom edge of the film may be located below the shaft.

The drawer may comprise a first connector comprising a first electrical contact and a spring biasing the first electrical contact.

The main housing may comprise a second connector comprising a second electrical contact configured to contact the first connector. The second connector may be configured to be connected with the first connector with the spring in a deformed state.

The film may be located below the second connector.

Since the film is located below the second connector, heat can be restrained from being transferred from the fixing device to the second connector.

The process unit may comprise a photosensitive drum and a development roller that supplies toner to the photosensitive drum. A bottom edge of the film may be located below the development roller.

Since the bottom edge of the film is located below the development roller, heat can be restrained from being transferred from the fixing device to the development roller.

The main housing may further comprise a first frame located above the fixing device and a second frame configured to be assembled onto the first frame. The second frame may comprise a hook to which the film is hooked. The film may be clamped between the first frame and the second frame.

Since the film is clamped between the first frame and the second frame, the upper end portion of the film can be held without the film flapping around.

The first frame may support an ejection roller located downstream of the fixing device in the direction of conveyance of the sheet. The ejection roller may be configured to eject the sheet outside the main housing.

The process unit may comprise a drawer in which the cartridge is installable into and removable from. The drawer may be installable into and removable from the main housing. The main housing may comprise a shaft engageable with the drawer. The first frame may comprise an engaging portion configured to be engaged with the shaft. The film may be located between the engaging portion and the fixing device.

The fixing device may comprise a shutter configured to cover and uncover an opening through which the sheet enters the fixing device and an opening member configured to open the shutter by contacting the shaft. The film may include a notch at a position corresponding to the opening member.

Since the film includes a notch at a position corresponding to the opening member, the opening member can securely contact the shaft.

The rotatable heating body and the rotatable pressure body may form a fixing nip that nips the sheet. The process unit may comprise a photosensitive drum and a transfer roller. The photosensitive drum and the transfer roller may form a drum transfer nip that nips the sheet. A bottom edge of the film may be located above a straight line connecting the fixing nip and the drum transfer nip, as viewed in a width direction perpendicular to the direction of conveyance of the sheet.

BRIEF DESCRIPTION OF DRAWINGS

The above aspects, other advantages and further features will become more apparent by describing in detail illustrative, non-limiting embodiments thereof with reference to the accompanying drawings, in which.

DESCRIPTION

Figure 1:
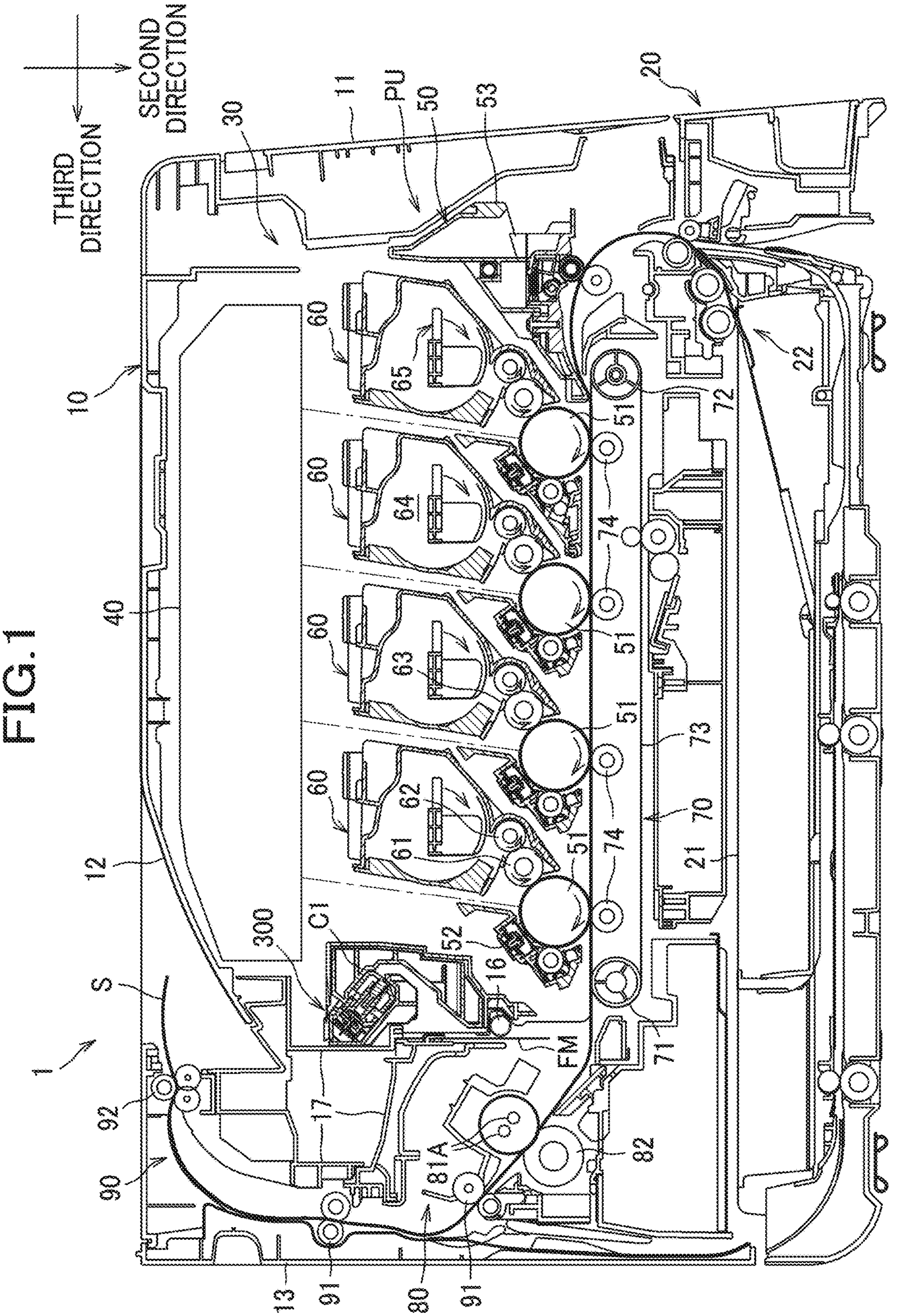
FIG. 1 is a cross-sectional view of an image forming apparatus according to an embodiment.

An embodiment of an image forming apparatus will be described in detail referring to the drawings where appropriate.

As shown in FIG. 1, the image forming apparatus 1 comprises a main housing 10, a sheet feeder unit 20, an image forming unit 30, and a sheet ejection unit 90.

In the drawings, the arrows showing the first direction, the second direction, the third direction, and the fifth direction point toward a first side in the respective directions, and the side opposite to the first side is a second side in the respective directions.

In the present embodiment, the first direction is a direction along an axial direction of a heating roller 81. The first direction is also a width direction perpendicular to a direction of conveyance of a sheet S. The second direction is a direction perpendicular to the first direction. The second direction is also a vertical direction. The third direction is a direction perpendicular to the first direction and the second direction.

In the present embodiment, the first side in the first direction corresponds to a right side of the image forming apparatus 1. The first side in the second direction corresponds to downward in the vertical direction. The first side in the third direction corresponds to a rear side of the image forming apparatus 1. Accordingly, the user operates the image forming apparatus 1 at a front side, which is the second side in the third direction, of the image forming apparatus 1.

The main housing 10 comprises a front cover 11, an output tray 12, and a rear cover 13. The front cover 11 covers and uncovers an opening provided on a front side of the main housing 10. The rear cover 13 covers and uncovers an opening provided on a rear side of the main housing 10.

The main housing 10 further comprises a housing connector 300.

The sheet feeder unit 20 comprises a sheet tray 21 and a feeder mechanism 22. The sheet tray 21 contains sheets S of paper or the like. The feeder mechanism 22 feeds the sheets S in the sheet tray 21 to the image forming unit 30.

The image forming unit 30 comprises an exposure device 40, a process unit PU, a transfer unit 70, and a fixing device 80.

The exposure device 40 is located above the process unit PU. The exposure device 40 emits light beams to expose surfaces of photosensitive drums 51.

The process unit PU is located between the sheet tray 21 and the exposure device 40. The process unit PU is installable into and removable from the main housing 10 through an opening that is accessible by opening the front cover 11. The process unit PU comprises a drum unit 50 and a plurality of toner cartridges 60.

The drum unit 50 comprises a plurality of photosensitive drums 51, a plurality of chargers 52 corresponding to the plurality of photosensitive drums 51, and a drum frame 53 as an example of a drawer.

The drum frame 53 supports the photosensitive drums 51 and the chargers 52. The drum frame 53 is installable into and removable from the main housing 10. The toner cartridges 60 are installable into and removable from the drum frame 53.

In the present embodiment, when the drum unit 50 is being installed into the main housing 10, the drum unit 50 moves with respect to the main housing 10 in a direction along the third direction from the second side in the third direction toward the first side in the third direction, and then obliquely toward the first side in the second direction and the first side in the third direction. When the drum unit 50 is being removed from the main housing, the drum unit 50 moves with respect to the main housing 10 obliquely toward the second side in the third direction and the second side in the second direction, and then along the third direction from the first side in the third direction toward the second side in the third direction.

In the following descriptions, the oblique rearward-and-downward direction in which the drum unit 50 moves when the drum unit 50 is being installed into the main housing 10 and the oblique frontward-and-upward direction in which the drum unit 50 moves when the drum unit 50 is being removed from the main housing 10 will be referred to as a fifth direction. The first side in the fifth direction is the oblique rearward-and-downward side in which the drum unit 50 moves. The second side in the fifth direction is the oblique frontward-and-upward side in which the drum unit 50 moves.

The plurality of toner cartridges 60 each contain toner of a different color. Each toner cartridge 60 comprises a development roller 61, a supply roller 62, a doctor blade 63, a toner container 64 in which toner is contained, and an agitator 65.

The agitator 65 agitates toner in the toner container 64. The agitator 65 supplies toner to the supply roller 62. The supply roller 62 supplies toner to the development roller 61. The doctor blade 63 adjusts the thickness of toner on the development roller 61 to a uniform thickness.

The transfer unit 70 is located between the sheet tray 21 and the process unit PU. The transfer unit 70 comprises a drive roller 71, a follower roller 72, a conveyor belt 73, and a plurality of transfer rollers 74. The conveyor belt 73 is an endless belt for conveying the sheet S. The drive roller 71 and the follower roller 72 cause the conveyor belt 73 to rotate. The transfer rollers 74 are positioned to face an inside surface of the conveyor belt 73. Each transfer roller 74 nips the sheet S, which is conveyed by the conveyor belt 73 in combination with the corresponding photosensitive drum 51. The transfer roller 74 and the photosensitive drum 51 form a drum transfer nip NP1 (see FIG. 6).

The fixing device 80 is located downstream of the process unit PU in a direction of conveyance of the sheet S. The fixing device 80 comprises a heating roller 81 as an example of a rotatable heating body, and a pressure roller 82 as an example of a rotatable pressure body. The heating roller 81 heats the sheet S. Two heaters 81A are disposed inside the heating roller 81 as a heating source. The heaters 81A are, for example, a halogen heater. The heaters 81A extend in the axial direction. The heating roller 81 is caused to rotate by receiving a driving force from a driving source not shown in the drawings. The heating roller 81 extends in the width direction perpendicular to the direction of conveyance of the sheet S.

The pressure roller 82 nips the sheet S in combination with the heating roller 81. The pressure roller 82 rotates in accordance with the rotation of the heating roller 81. The pressure roller 82 forms a fixing nip NP2 in combination with the heating roller 81.

Each of the chargers 52 charges a surface of a corresponding photosensitive drum 51. The exposure device 40 exposes the surface of each photosensitive drum 51. Thereby, an electrostatic latent image is formed on each photosensitive drum 51. Each development roller 61 supplies toner to the corresponding photosensitive drum 51. A toner image is thereby formed on each photosensitive drum 51.

The sheet feeder unit 20 feeds the sheet S through between each photosensitive drum 51 and the corresponding transfer roller 74. The toner images on the photosensitive drums 51 are transferred onto the sheet S. The sheet S with the toner images transferred thereon is conveyed through between the heating roller 81 and the pressure roller 82 and heat and pressure are applied to the sheet S. Thereby, the fixing device 80 thermally fixes the toner images onto the sheet S.

The sheet ejection unit 90 comprises a conveyor roller 91 and an ejection roller 92. The conveyor roller 91 conveys the sheet S to the ejection roller 92. The ejection roller 92 ejects the sheet S onto the output tray 12.

Figure 2:
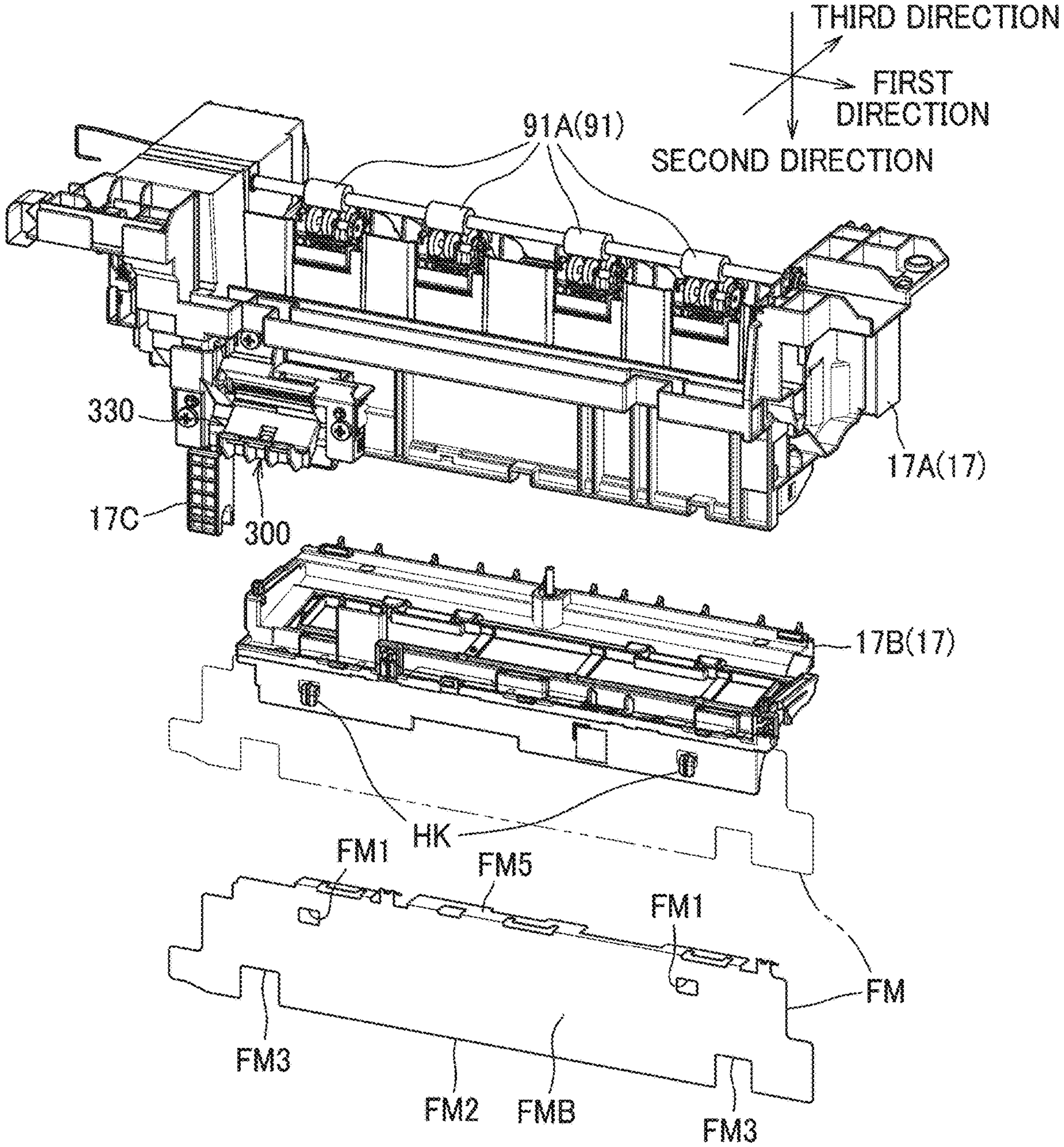
FIG. 2 is an exploded view of an ejection frame disassembled into a first frame and a second frame.
Figure 4:
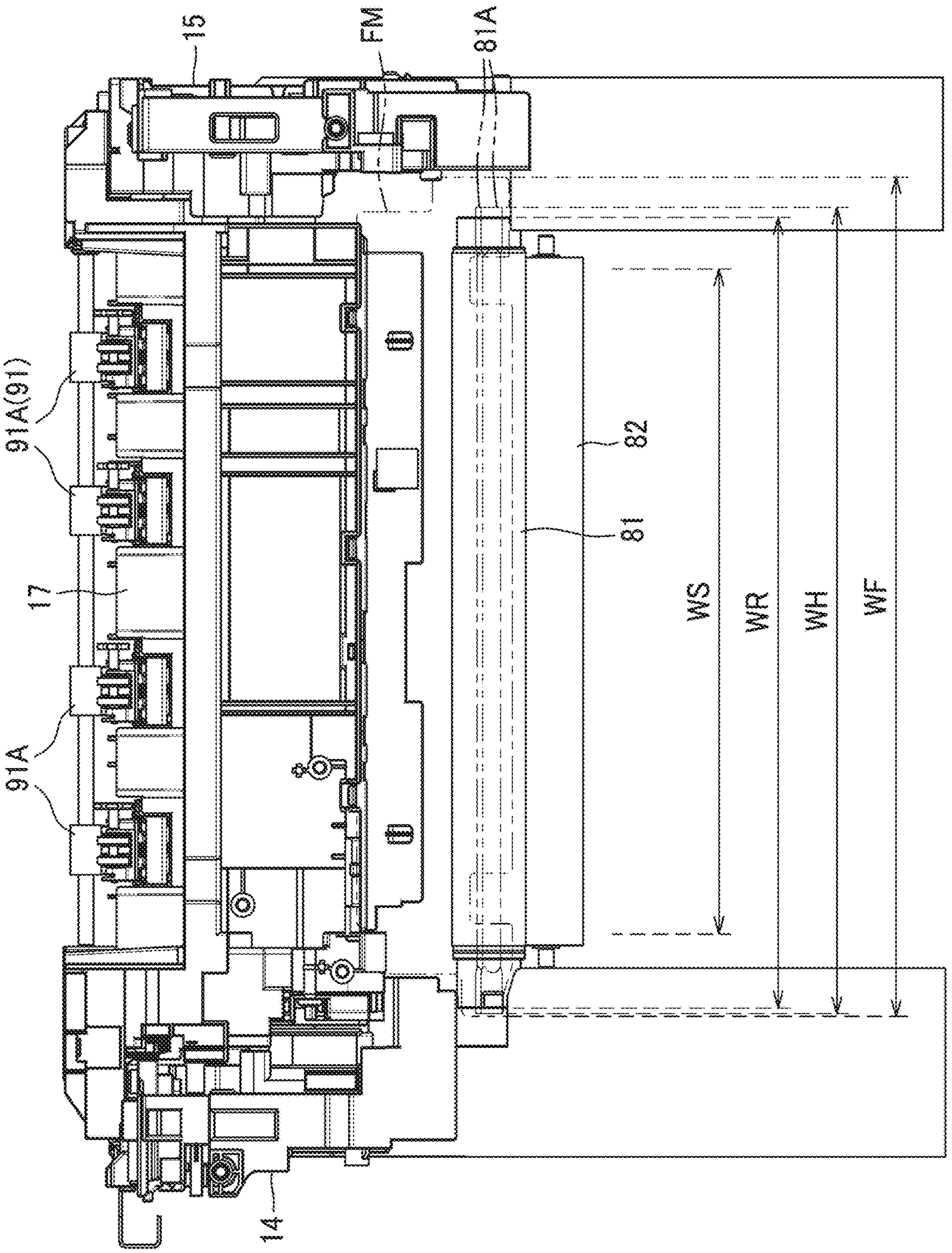
FIG. 4 is an illustration comparing sizes of a heating roller and a film.

As shown in FIG. 2 and FIG. 4, the main housing 10 further comprises a first side frame 14, a second side frame 15, and an ejection frame 17.

The first side frame 14 and the second side frame 15 are disposed apart from each other in the first direction. The process unit PU, the fixing device 80, and the ejection frame 17 are disposed between the first side frame 14 and the second side frame 15. The first side frame 14 and the second side frame 15 support the process unit PU, the fixing device 80, and the ejection frame 17.

The ejection frame 17 is located above the fixing device 80. The ejection frame 17 comprises a first frame 17A and a second frame 17B. The first frame 17A supports the ejection roller 91 that ejects the sheet S outside of the main housing 10. The ejection roller 91A is located downstream of the fixing device 80 in the direction of conveyance of the sheet S. The second frame 17B is assembled onto the first frame 17A from the first side in the second direction. The second frame 17B comprises hooks HK on a side facing the second side in the third direction.

The image forming apparatus 1 further comprises a film FM. The film FM is an elastically deformable film with an upper end attached to the main housing 10 at a position between the fixing device 80 and the process unit PU. More specifically, the film FM comprises a film body FMB, a pair of mounting holes FM1, a pair of notches FM3, and a bent portion FM5.

The film body FMB extends in the first direction and the second direction. In other words, the film FM has a shape of a sheet that extends in the first direction and the second direction.

The pair of mounting holes FM1 is located on the film body FMB. The pair of mounting holes FM1 is located apart from each other in the first direction.

The pair of notches FM3 are recesses recessed upward from the lower end FM2 of the film body FMB of the film FM toward the second side in the second direction, i.e., upward.

The bent portion FM5 extends from a top edge of the film body FMB toward the first side in the third direction.

Figure 3:
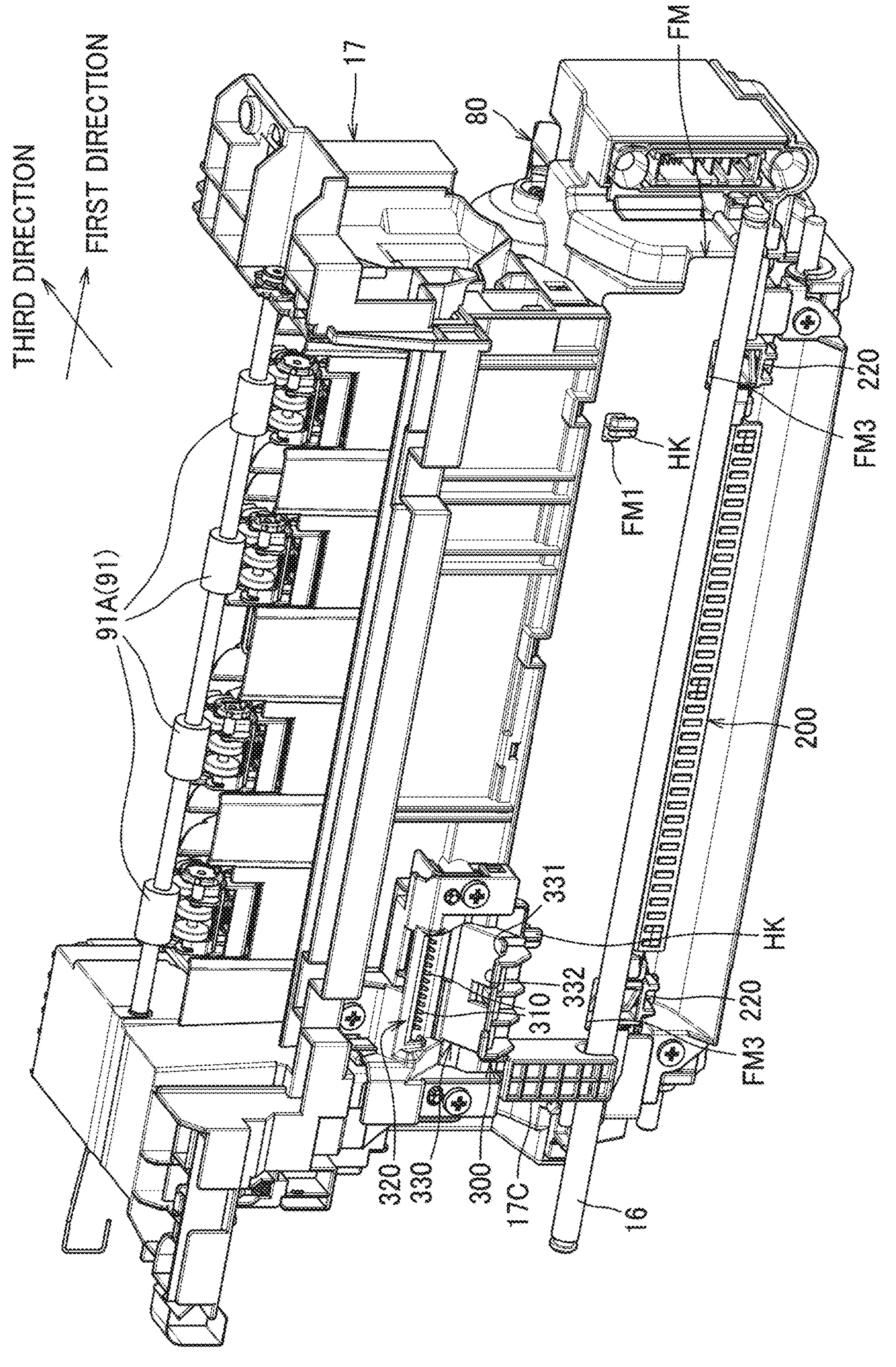
FIG. 3 is a perspective view of the ejection frame and a fixing device.
Figure 6:
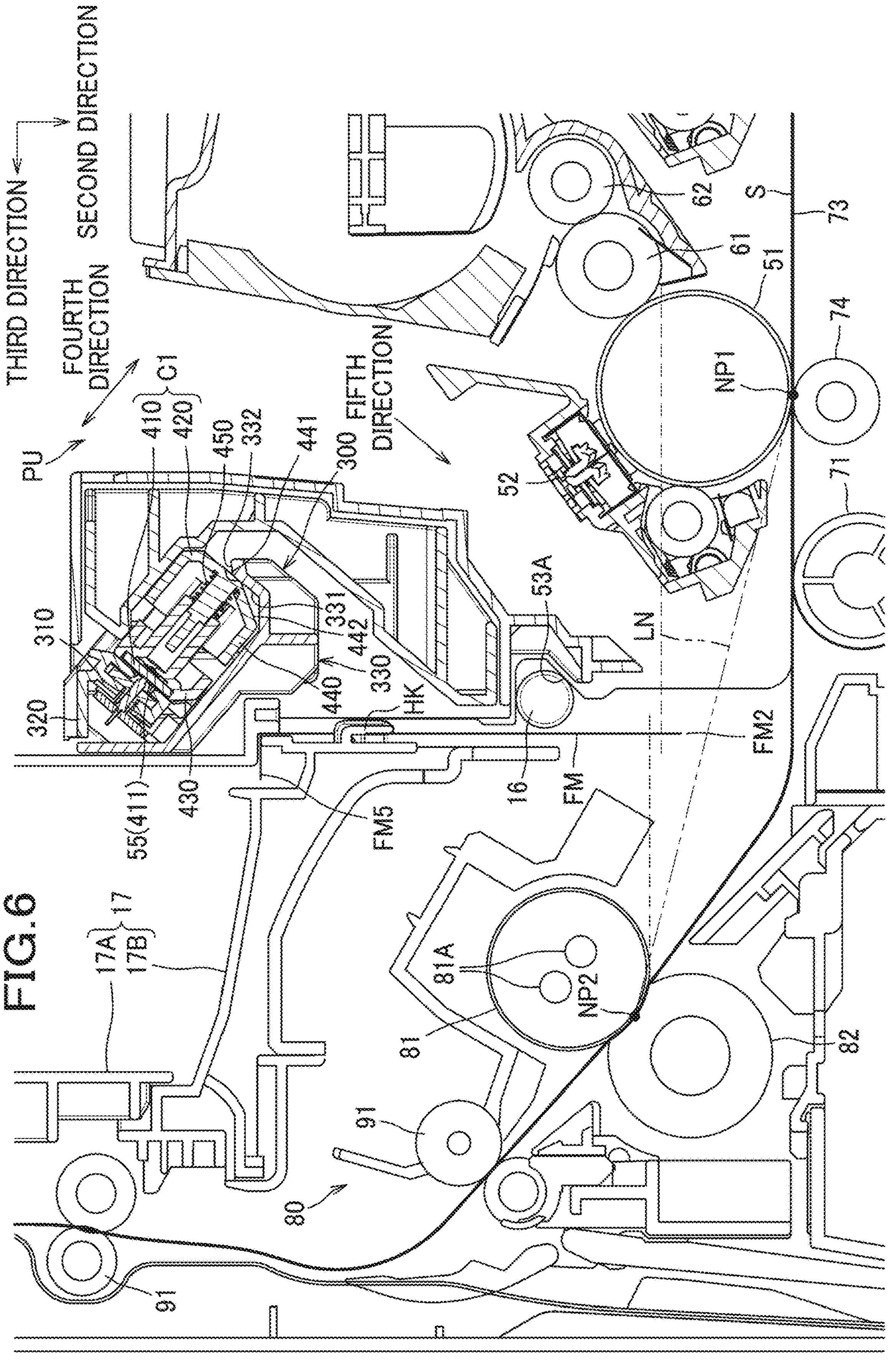
FIG. 6 is an enlarged view of an area around the fixing device shown in FIG. 1.

The film FM is hooked to the second frame 17B by hooking the mounting holes FM1 to the hooks HK. The bent portion FM5 is located above an upper end of the second frame 17B when the film FM is hooked to the hooks HK. Then, by the second frame 17B being assembled onto the first frame 17A, the bent portion FM5 of the film FM is held by the first frame 17A and the second frame 17B, as shown in FIG. 3 and FIG. 6. The film body FMB of the film FM extends downward from a position above an area through which the sheet S is conveyed.

As shown in FIG. 3, the first frame 17A further comprises an engaging portion 17C. The engaging portion 17C is engaged with a shaft 16 fixed to the main housing 10. The film FM is located between the engaging portion 17C and the fixing device 80.

Here, the shaft 16 is a member for positioning the process unit PU in place. One end of the shaft 16 is fixed to the first side frame 14 and the other end of the shaft 16 is fixed to the second side frame 15. The shaft 16 extends in the first direction. In the state in which the process unit PU is installed in the main housing 10, the shaft 16 contacts the process unit PU and positions the process unit PU in place. More specifically, as shown in FIG. 6, the shaft 16 is engaged with a notch 53A of the drum frame 53.

As shown in FIG. 4, the film FM extends further outward of an area WS, in the width direction perpendicular to the direction of conveyance of the sheet S, i.e., the first direction. The area WS is an area through which a sheet S having a maximum size on which an image is formable in the image forming apparats is conveyed. In other words, the area WS through which the sheet S having the maximum size is conveyed through is located within an area WF in which the film FM is located in the width direction.

The film FM extends further outward of the heating roller 81 in the width direction. In other words, the area WR in which the heating roller 81 is located is within the area WF in which the film FM is located in the width direction.

The film FM extends further outward of the heater 81A in the width direction. In other words, the area WH in which the heater 81A is located is within the area WF in which the film FM is located in the width direction. If the heater 81A is a halogen heater, the area in which the heater 81A is located is the area in which the glass tube of the heater 81A is located.

Figure 5:
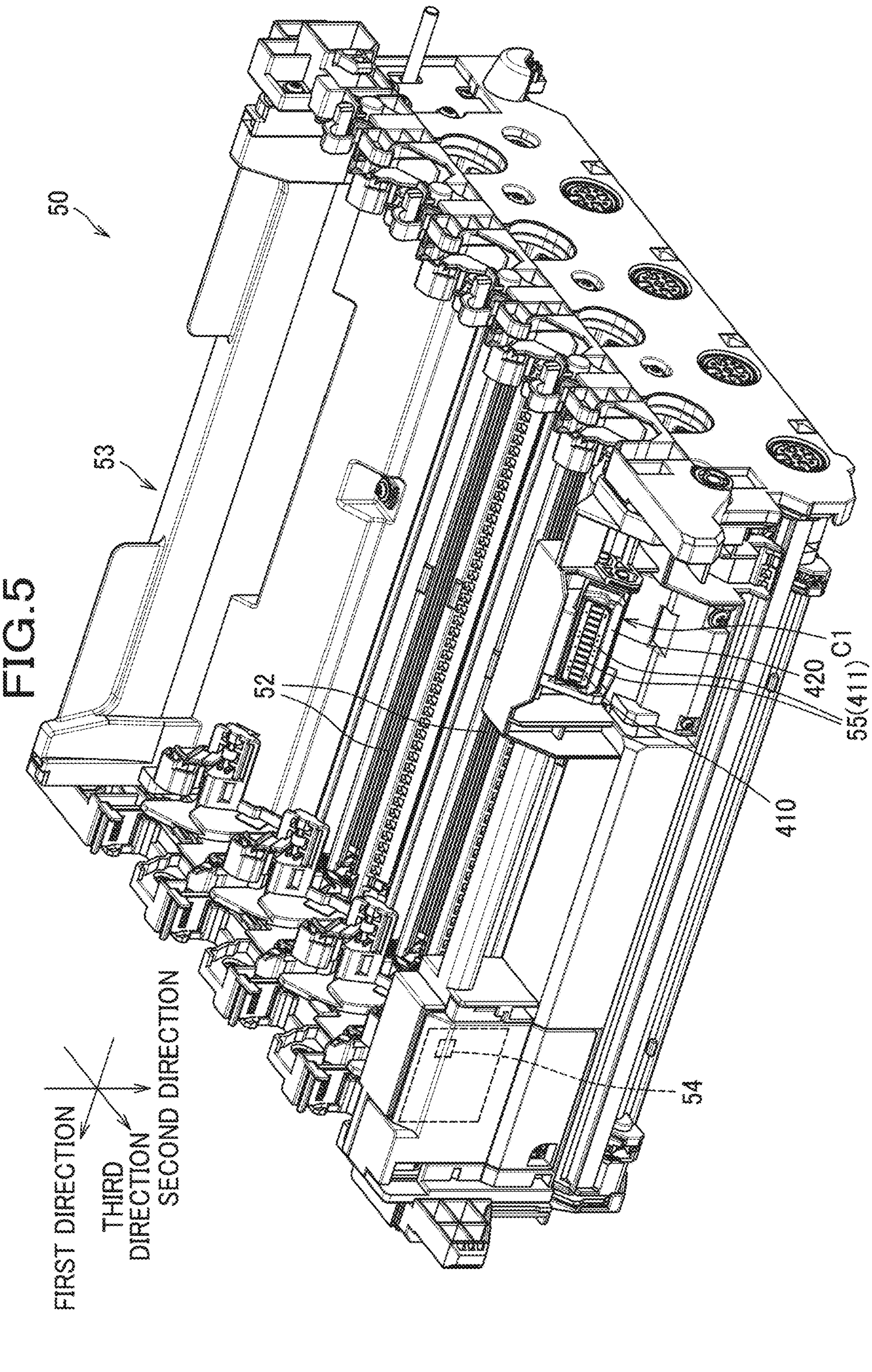
FIG. 5 is a perspective view of a drum frame.

As shown in FIG. 5, the drum unit 50 further comprises a drum memory 54 as a storage medium and a first connector C1.

The drum memory 54 is located on a side of the drum frame 53 on the first side in the first direction. The drum memory 54 stores information related to the drum unit 50. The information related to the drum unit 50 is, for example, information related to the photosensitive drums 51, and information related to service life of the drum unit 50. The information related to the photosensitive drums 51 is, for example, the date of manufacture of the photosensitive drums 51, the place of manufacture of the photosensitive drums 51, and the maximum number of rotations that the photosensitive drums 51 can be used. The information related to service life of the drum unit 50 is, for example, a total number of rotations of the photosensitive drums 51, and a total number of pages printed using the photosensitive drums 51.

The first connector C1 comprises an electrical contact surface 55 as a first electrical contact, a connector board 410, and a holder 420. The electrical contact surface 55 is located on a side of the drum frame 53 on the second side in the first direction. The electrical contact surface 55 is connected to the drum memory 54 via a cable not shown in the drawings.

The first connector C1 is electrically connected to the housing connector 300 when the drum unit 50 is installed in the main housing 10. The electrical contact surface 55 is electrically connected to housing electrodes 310 of the main housing 10 (see FIG. 3) when the first connector C1 is connected to the housing connector 300. A controller of the main housing 10 which is not shown in the drawings is capable of communicating with the drum memory 54 when the drum unit 50 is installed in the main housing 10 and the first connector C1 and the housing connector 300 are electrically connected.

The holder 420 holds the electrical contact surface 55. More specifically, the holder 420 holds a connector board 410 comprising electrodes 411. As shown in FIG. 6, the holder 420 comprises a first holder 430, a second holder 440, and a spring 450.

The first holder 430 holds the electrical contact surface 55. More specifically, the first holder 430 holds the connector board 410.

The second holder 440 holds the first holder 430. More specifically, the second holder 440 holds the first holder 430 in a manner that allows the first holder 430 to move in a fourth direction. The second holder 440 holds the first holder 430 in a manner that allows the first holder 430 to move linearly in the fourth direction.

The spring 450 biases the first holder 430 in the fourth direction to a side in which the electrical contact surface 55 moves away from the second holder 440. The spring 450 is located between the first holder 430 and the second holder 440. The spring 450 is, for example, a helical compression spring.

Referring back to FIG. 3, the housing connector 300 as a second connector comprises a plurality of housing electrodes 310 as a second electrical contact, a first connector frame 320 and a second connector frame 330.

The housing electrodes 310 are arranged in the first direction. The housing electrodes 310 are, for example, pogo pins.

The first connector frame 320 holds the housing electrodes 310.

As shown in FIG. 6, the housing connector 300 opens toward the second side in the fifth direction. As a result, the housing connector 300 is capable of receiving the first connector C1, which moves from the second side in the fifth direction toward the first side in the fifth direction when the drum unit 50 is being installed into the main housing 10.

The second connector frame 330 has a contact surface 331 and a guide surface 332.

The contact surface 331 contacts the second holder 440 of the first connector C1 in a state where the drum unit 50 is installed in the main housing 10. The contact surface 331 is opposed to the housing electrode 310 in the fourth direction.

The fourth direction is a direction that intersects the electrical contact surface 55. In the present embodiment, the fourth direction is a direction perpendicular to the electrical contact surface 55. More specifically, the fourth direction is a direction perpendicular to the electrical contact surface 55 in a state where the drum unit 50 is installed in the main housing 10 and the electrical contact surface 55 is in contact with the housing electrodes 310.

The first connector C1 is located between the housing electrodes 310 and the contact surface 331 in the state where the drum unit 50 is installed in the main housing 10. The contact surface 331 is perpendicular to the fourth direction.

The guide surface 332 is configured to guide the second holder 440 of the first connector C1 toward the contact surface 331 when the drum unit 50 is being installed into the main housing 10. The guide surface 332 extends from the contact surface 331. The guide surface 332 is inclined with respect to the fourth direction. More specifically, the guide surface 332 is inclined such that the farther it is from the contact surface 331, the farther it is from the housing electrode 310 in the fourth direction.

The second holder 440 comprises a holder edge surface 441 and an inclined surface 442.

The holder edge surface 441 is in contact with the contact surface 331 in a state where the drum unit 50 is installed in the main housing 10. The holder edge surface 441 is an edge surface of the second holder 440 distant from the electrical contact surface 55 in the fourth direction.

The inclined surface 442 contacts the guide surface 332 of the housing connector 300 when the drum unit 50 is being installed into the main housing 10. The inclined surface 442 extends from the holder edge surface 441. The inclined surface 442 is inclined with respect to the fourth direction. More specifically, the inclined surface 442 is inclined such that the farther it is from the holder edge surface 441, the closer it is to the electrical contact surface 55 in the fourth direction.

The spring 450 is configured to bias the first holder 430 toward the housing electrode 310 in a state where the drum unit 50 is installed in the main housing 10 in which the electrical contact surface 55 is in contact with the housing electrode 310 and the holder edge surface 441 is in contact with the contact surface 331. Thus, the electrical contact surface 55 is pressed against the housing electrodes 310 by the restoring force of the spring 450.

The film FM is located between the process unit PU and the fixing device 80. More specifically, the film FM is located on a side of the process unit PU on the first side in the third direction, and the fixing device 80 is located on a side of the film FM on the first side in the third direction. A bottom edge FM2 of the film FM is located below the development roller 61 included in the process unit PU.

The bottom edge FM2 of the film FM is located above a straight line LN connecting a center of the drum transfer nip NP1 and a center of the fixing nip NP2 as viewed from the width direction perpendicular to the direction of conveyance of the sheet S.

The bottom edge FM2 of the film FM is located below the shaft 16.

The bottom edge FM2 of the film FM is located below a bottom edge of the heating roller 81.

The film FM is located below the housing connector 300 in the vertical direction.

Figure 7:
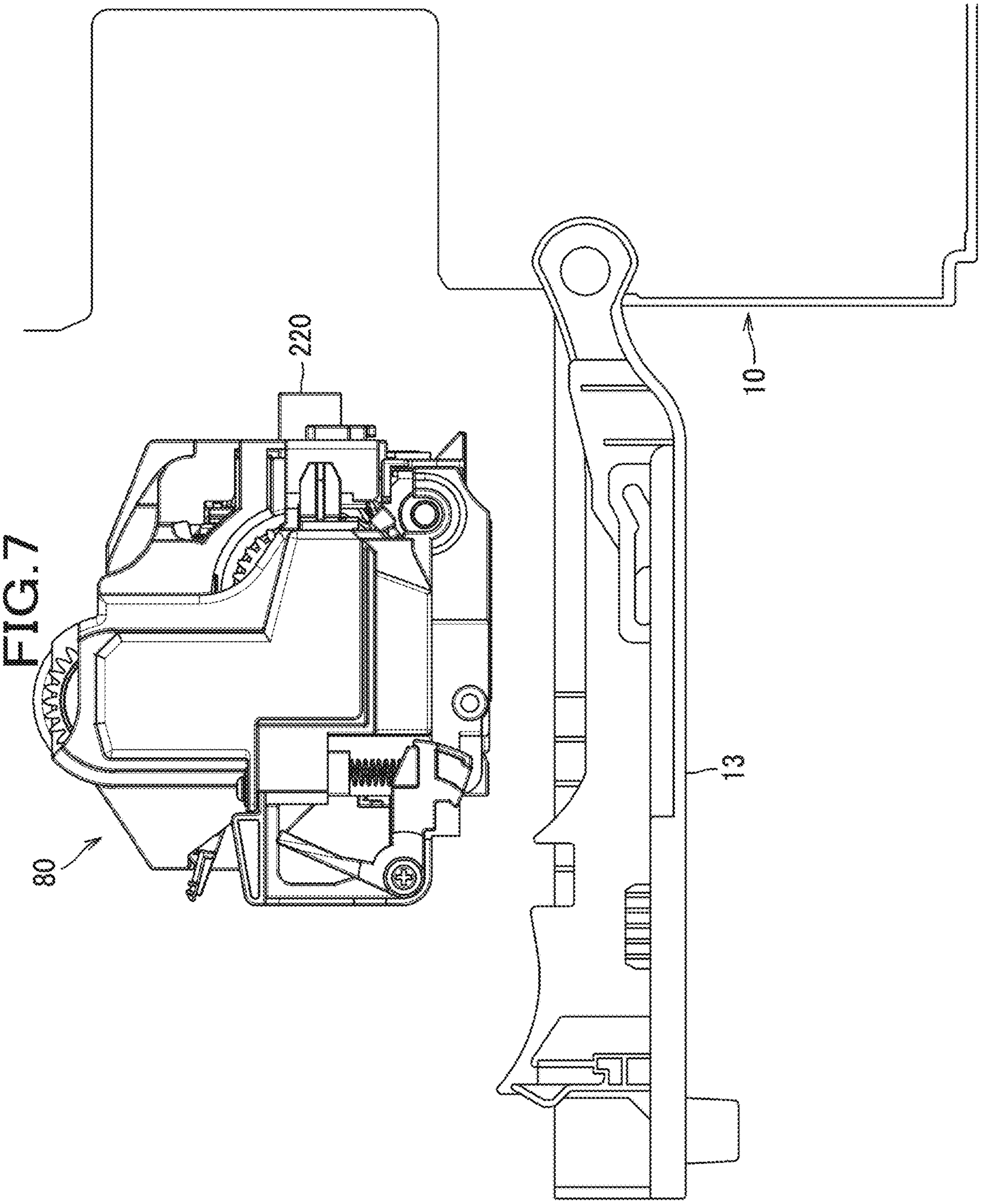
FIG. 7 is an illustration showing the fixing device removed from a main housing.

As shown in FIG. 7, the fixing device 80 is installable into and removable from the main housing 10 through the opening that is accessible by opening the rear cover 13. In other words, the main housing 10 supports the fixing device 80 in a manner that allows the fixing device 80 to be installed into and removed from the main housing 10.

Figure 8:
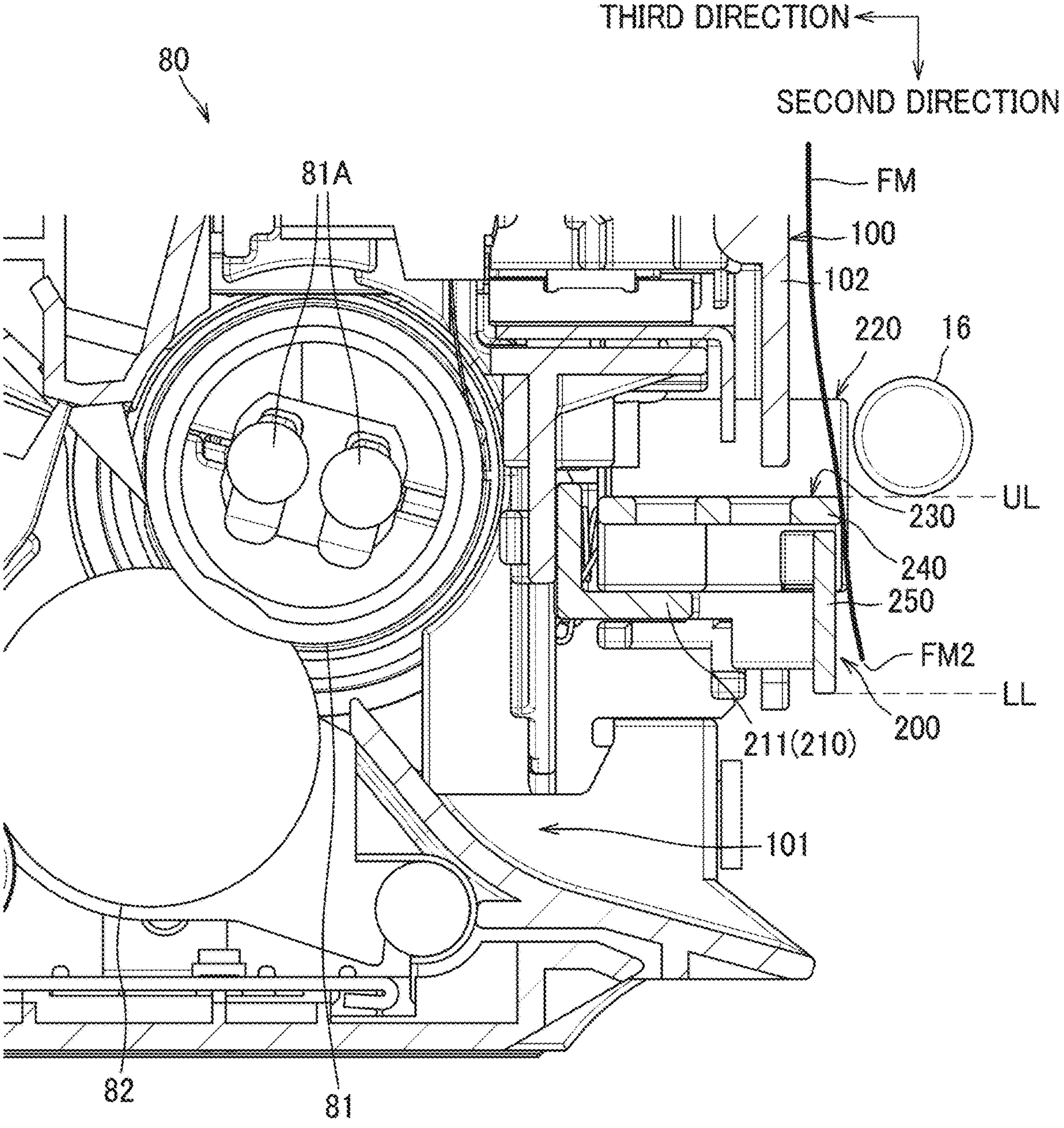
FIG. 8 is a cross-sectional view of the fixing device showing a state in which a shutter is open.

As shown in FIG. 8, the fixing device 80 further comprises a fixing device housing 100 and a shutter unit 200.

The fixing device housing 100 has an opening 101 that allows the sheet S to pass therethrough. The opening 101 is an opening through which the sheet S conveyed from the outside of the fixing device housing 100 passes to enter the fixing device housing 100. The fixing device housing 100 is installable into and removable from the main housing 10.

Figure 9:
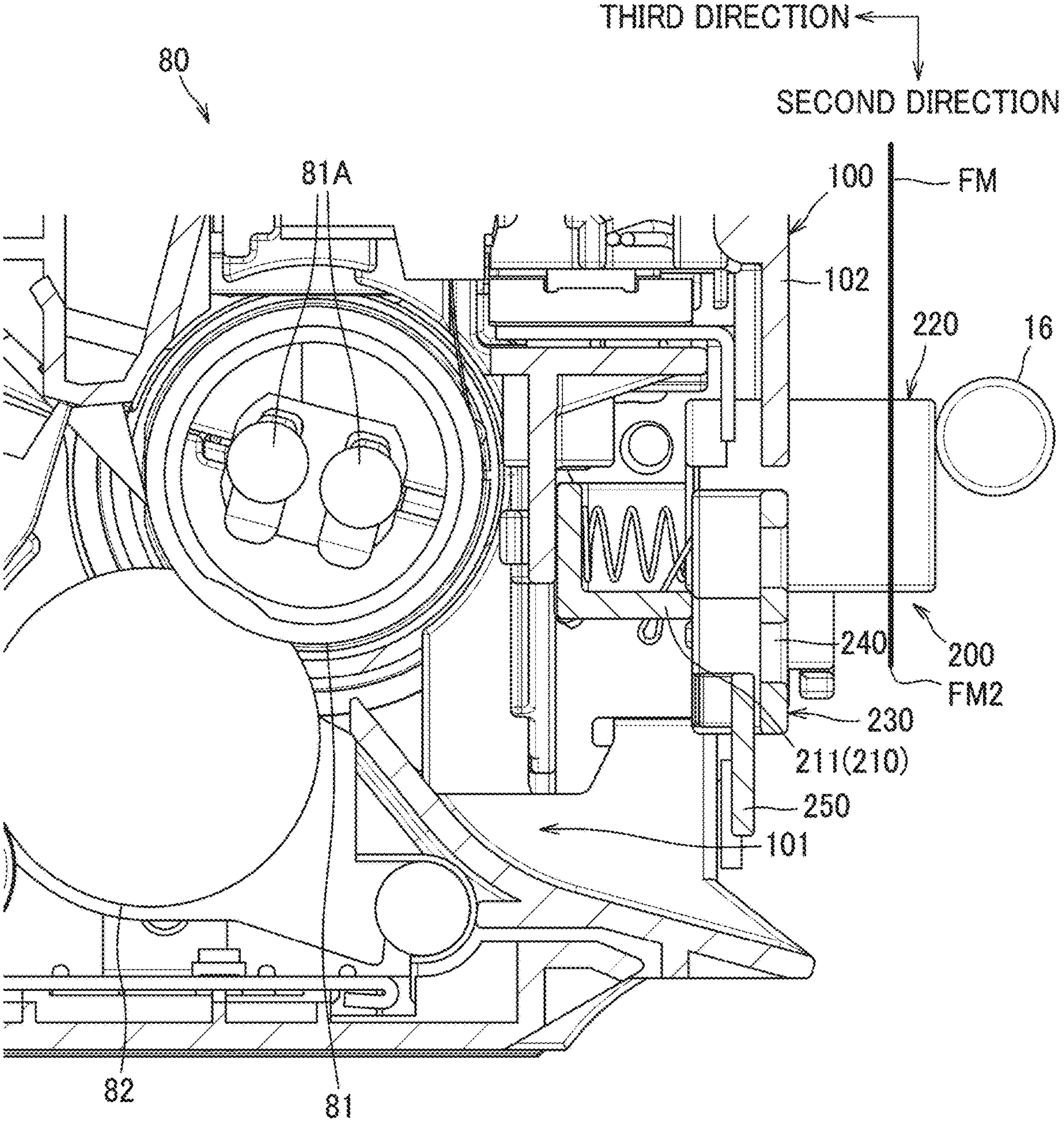
FIG. 9 is a cross-sectional view of the fixing device showing a state in which the shutter is closed.

The shutter unit 200 is a mechanism for opening and closing the opening 101. The shutter unit 200 is switchable to an open state, i.e., an open position, as shown in FIG. 8, and to a closed state, i.e., a closed position, as shown in FIG. 9. The shutter unit 200 uncovers the opening 101 when in the open state. The shutter unit 200 covers the opening 101 when in the closed state.

The shutter unit 200 may cover at least part of the opening 101 when in the closed state. More specifically, the shutter unit 200 covers the opening 101 to such an extent as not to allow a user to insert his/her finger therein.

The film FM is located at a position between the shutter unit 200 and the shaft 16. The bottom edge FM2 of the film FM is located below a top edge UL and above a bottom edge LL of the shutter unit 200 in the open state shown in FIG. 8.

Figure 10:
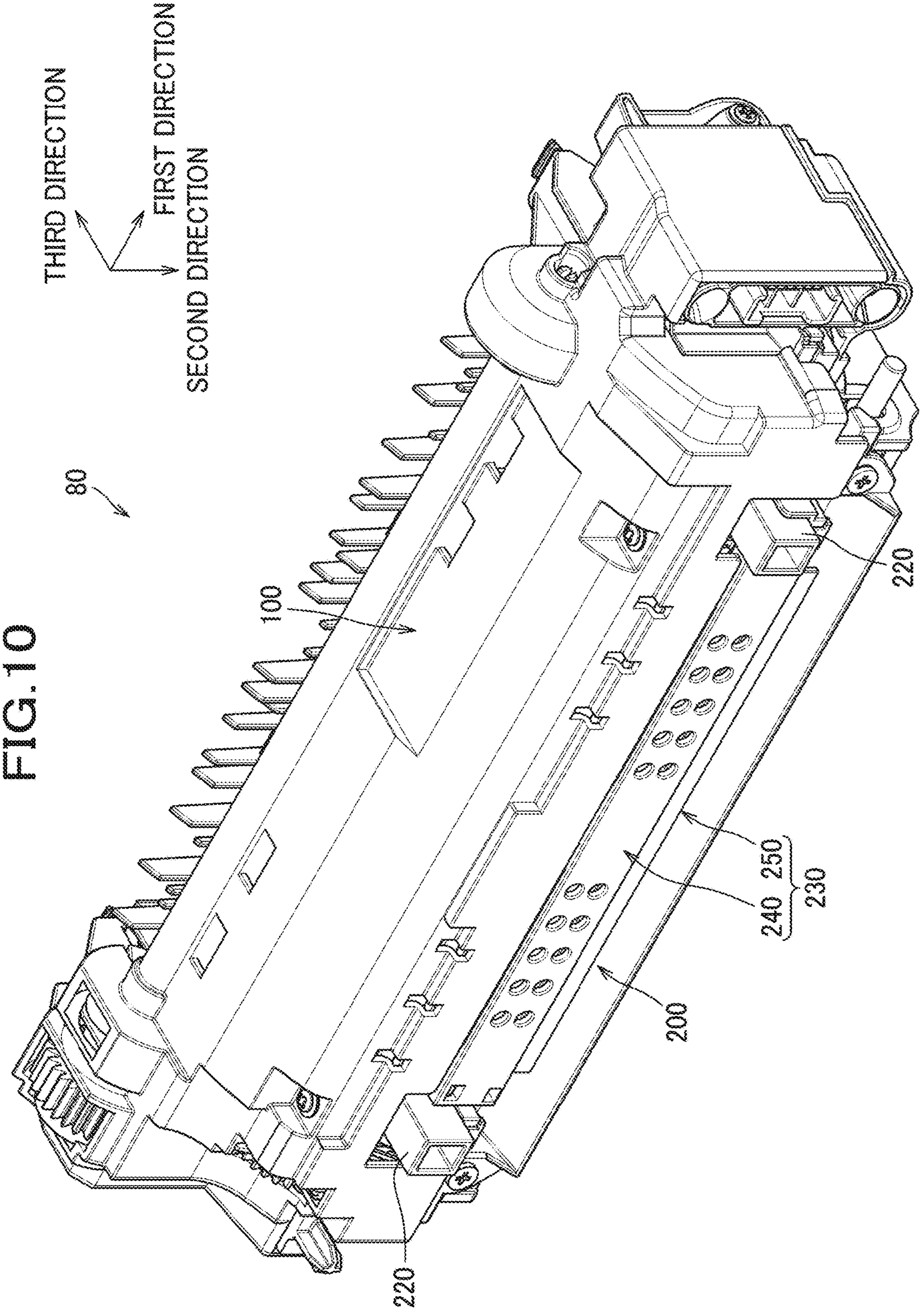
FIG. 10 is a perspective view of the fixing device.
Figure 11:
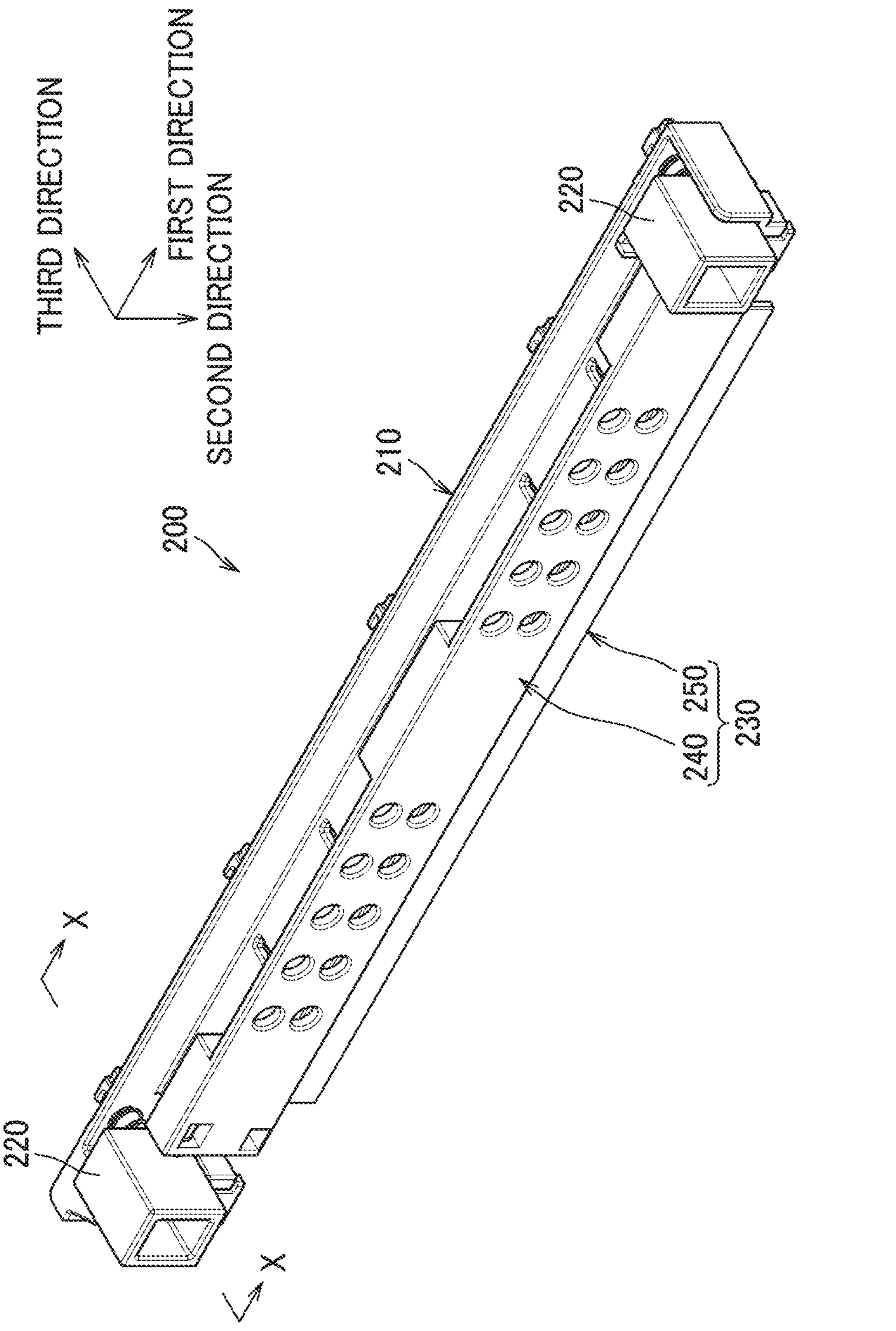
FIG. 11 is a perspective view of a shutter unit.

As shown in FIG. 10 and FIG. 11, the shutter unit 200 comprises a support member 210, two opening members 220, and a shutter 230. The support member 210, the two opening members 220, and the shutter 230 are made of plastic or the like. As shown in FIG. 3, the film FM has notches FM3 at portions corresponding to the opening members 220. In the following descriptions, the first direction, the second direction, and the third direction shown in FIG. 10 are used to describe directions.

The support member 210 supports the opening members 220 in a manner that allows the opening members 220 to move in the third direction. As shown in FIG. 8, the support member 210 is fixed to the fixing device housing 100.

Figure 12:
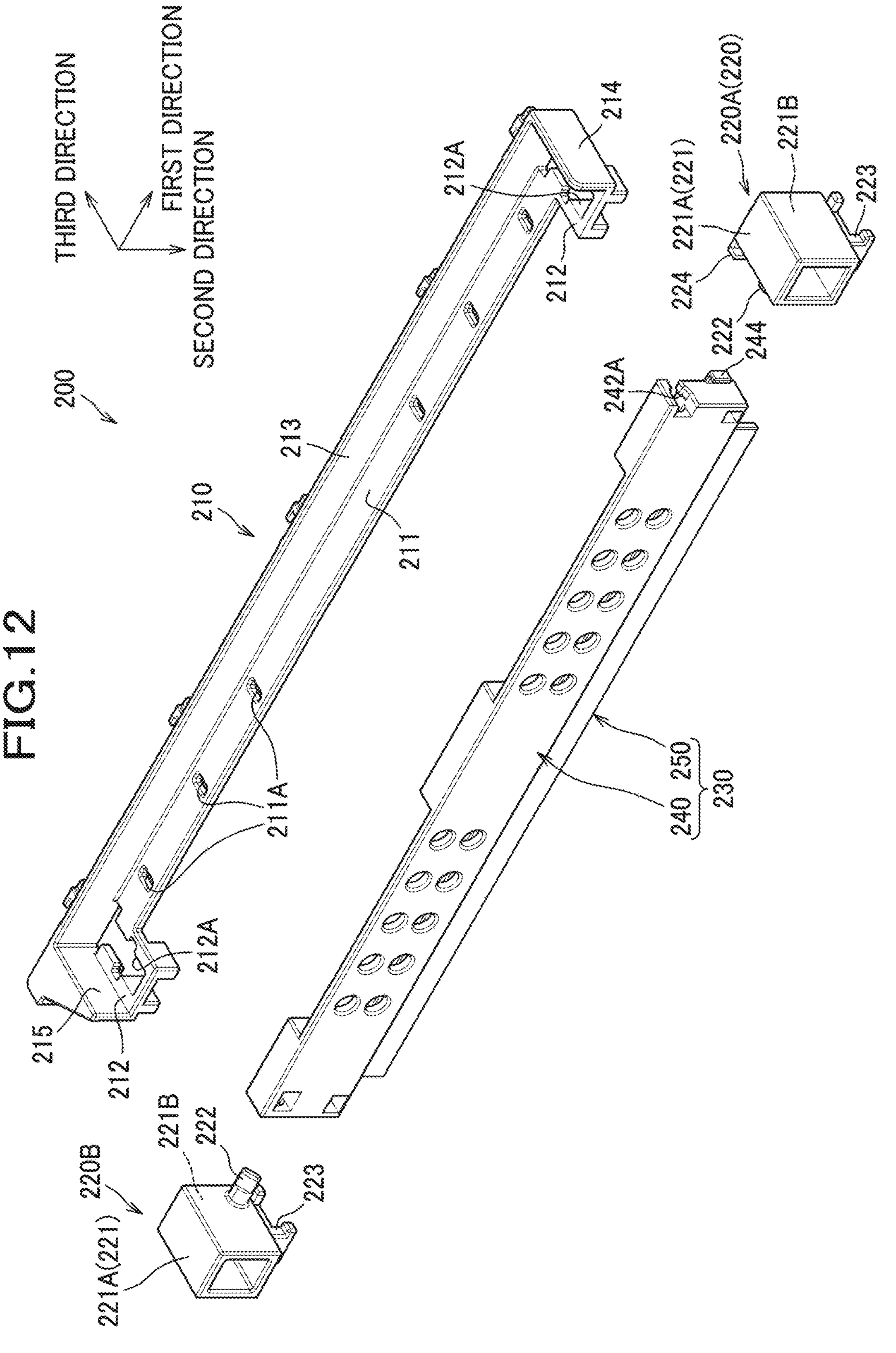
FIG. 12 is an exploded perspective view of the shutter unit.

As shown in FIG. 12, the support member 210 includes an opposing portion 211, two support portions 212, a first wall 213, a second wall 214, and a third wall 215.

The opposing portion 211 is a plate-shaped member. The opposing portion 211 has a surface perpendicular to the second direction. The opposing portion 211 includes a plurality of holes 211A. Each of the holes 211A extends through the opposing portion 211 in the second direction, i.e., in the vertical direction.

The support portions 212 are portions for supporting the opening members 220 in a manner that allows the opening members 220 to move. One of the two support portions 212 is disposed at one end of the opposing portion 211 facing toward the first side in the first direction. The other support portion 212 is disposed at the other end of the opposing portion 211 facing toward the second side in the first direction.

The support portions 212 protrude further, than the opposing portion 211, toward the second side in the third direction. Each of the support portions 212 includes a long hole 212A elongated in the third direction.

The first wall 213 protrudes from ends, facing toward the first side in the third direction, of the opposing portion 211 and the support portion 212 in a direction toward the second side in the second direction.

The second wall 214 is located at an end of the first wall 213 facing toward the first side in the first direction. The second wall 214 is located at one of the support portions 212 provided at the end of the opposing portion 211 facing in the direction toward the first side in the first direction, and extends toward the second side in the second direction. The support portion 212 provided at the one end of the opposing portion 211 is located between the opposing portion 211 and the second wall 214 in the first direction.

The third wall 215 is located at an end of the first wall 213 facing toward the second side in the first direction. The third wall 215 is located at one of the support portions 212 provided at the other end of the opposing portion 211 facing in the direction toward the second side in the first direction, and extends toward the second side in the second direction. The support portion 212 provided at the other end of the opposing portion 211 is located between the opposing portion 211 and the third wall 215 in the first direction.

The opening member 220 is capable of moving between a first position shown in FIG. 9 and a second position shown in FIG. 8. The second position is a position in which the opening member 220 is retracted into the fixing device housing 100 relative to the first position. When the opening member 220 is located in the first position, the opening member 220 protrudes from an outer surface 102 of the fixing device housing 100.

As shown in FIG. 12, one opening member 220 is disposed on each of two ends of the shutter 230 respectively facing toward the first side in the first direction and the second side in the first direction. Each of the two opening members 220 includes a body 221, a boss 222, and a leg 223. In the following description, the opening member 220 on the first side in the first direction is referred to as first opening member 220A, and the opening member 220 on the second side in the first direction is referred to as second opening member 220B.

The body 221 is supported from below by the corresponding support portion 212 of the support member 210. The body 221 includes a first part 221A and a second part 221B. The first part 221A has a shape of a rectangular tube. A dimension of the first part 221A in the third direction is greater than dimensions of the first part 221A in the other directions. The second part 221B covers an opening provided on one side of the first part 221A facing toward the first side in the third direction.

The boss 222 protrudes from the body 221 in the first direction toward the shutter 230. The boss 222 supports the shutter 230 in a manner that allows the shutter 230 to rotate.

The leg 223 protrudes downward from the body 221. The leg 223 is inserted into the long hole 212A of the corresponding support portion 212.

The first opening member 220A further includes a spring hooking portion 224. The spring hooking portion 224 is a part for hooking a shutter spring 260 (that will be described later) thereto. The spring hooking portion 224 is disposed on a surface of the body 221 facing the shutter 230.

Figure 13A:
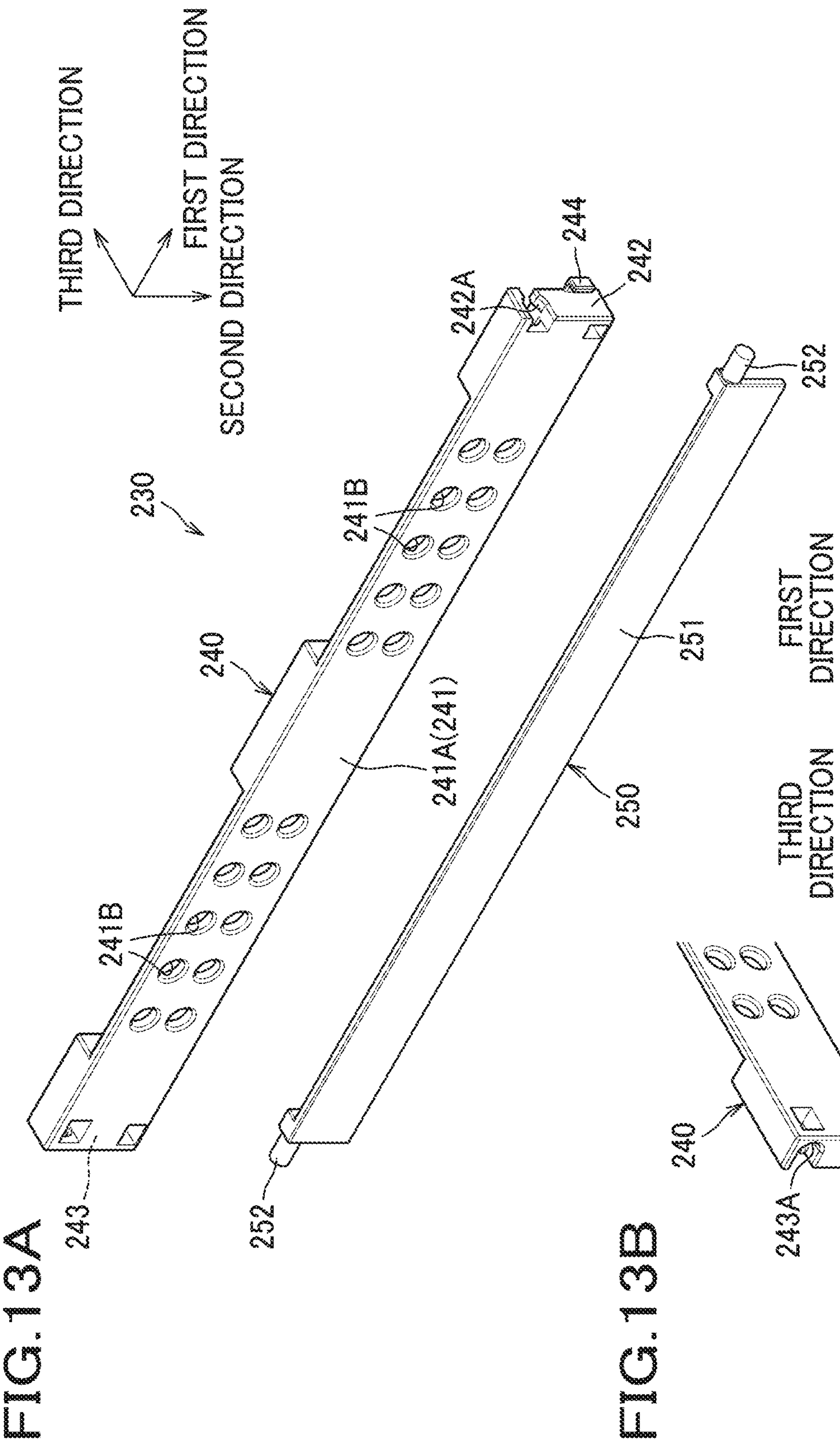
FIG. 13A is an exploded perspective view of the shutter.

As shown in FIG. 8 and FIG. 9, the shutter 230 is a member configured to open and close the opening 101 of the fixing device housing 100. As shown in FIG. 12 and FIG. 13A, the shutter 230 includes a first shutter 240 and a second shutter 250.

Figures 15A, 15B, 15C:
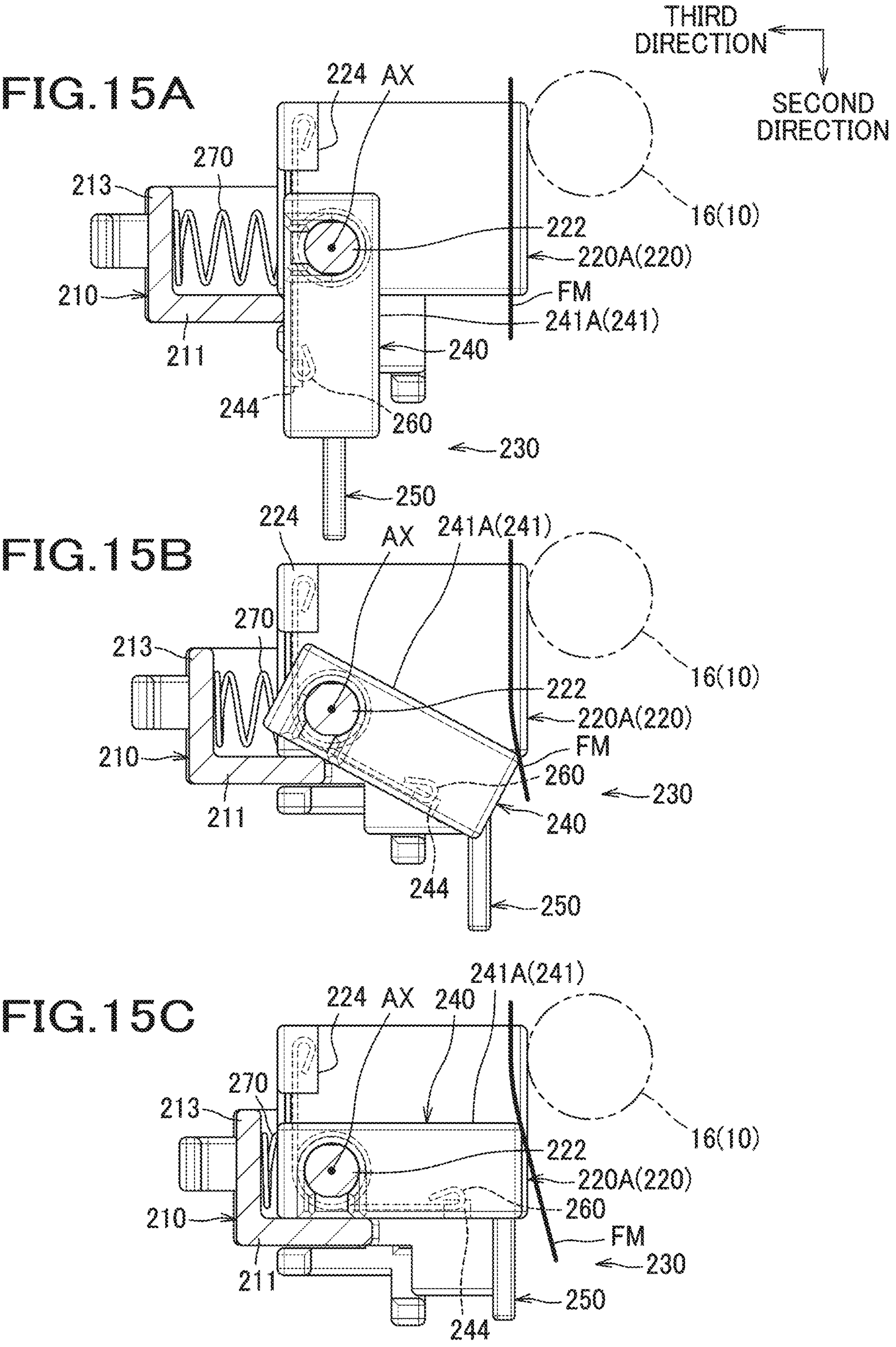
FIG. 15A is a cross-sectional view taken along line X-X in FIG. 11 showing a state in which an opening member is located in a first position.
FIG. 15B is a cross-sectional view taken along line X-X in FIG. 11 showing a state in which the opening member is located between the first position and a second position.
FIG. 15C is a cross-sectional view taken along line X-X in FIG. 11 showing a state in which the opening member is located in the second position.

As shown in FIGS. 15A to 15C, the first shutter 240 is rotatably supported by the two opening members 220. Thereby, a rotation axis AX of the first shutter 240 is movable in the third direction together with the opening members 220. The second shutter 250 is rotatably supported by the first shutter 250.

The first shutter 240 is rotatable and thus rendered switchable between a first posture shown in FIG. 15A and a second posture shown in FIG. 15C. Specifically, the first shutter 240 is configured to open by rotating from the posture in FIG. 15A, through the posture in FIG. 15B, and finally to the posture in FIG. 15C. Further, the first shutter 240 is configured to close by rotating from the posture in FIG. 15C, through the posture in FIG. 15B, and finally to the posture in FIG. 15A. The second shutter 250 is caused to rotate by gravity in accordance with the opening and closing of the first shutter 240. The first shutter 240 in the first posture extends downward from the bosses 222 of the opening members 220. The first shutter 240 in the second posture extends toward the second side in the third direction from the bosses 222. The first shutter 240 in the second posture is located above the opening 101 shown in FIG. 8.

The first shutter 240 is in the first posture when the shutter 230 is in the closed state. The first shutter 240 is in the second posture when the shutter 230 is in the open state.

Figure 13B:
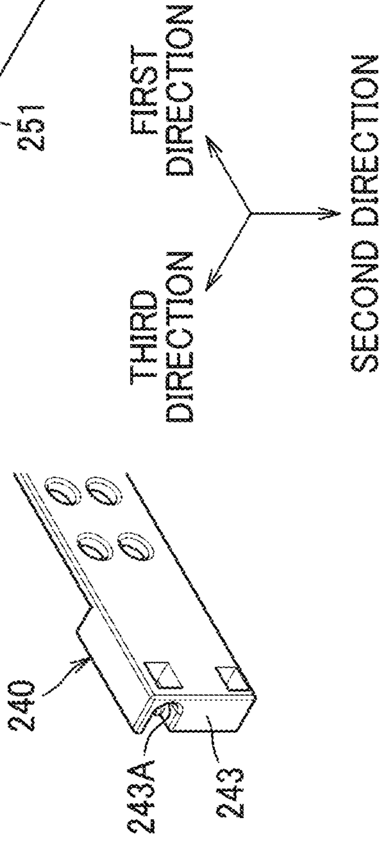
FIG. 13B is a perspective view of an end of a first shutter facing toward a second side in a first direction.

As shown in FIG. 13A and FIG. 13B, the first shutter 240 includes a plate-shaped portion 241, a first side wall portion 242, a second side wall portion 243, and a spring hooking portion 244.

The plate-shaped portion 241 is a plate-shaped part, having a dimension in the first direction greater than the dimensions in the other directions. The plate-shaped portion 241 includes an outer surface 241A and a plurality of through holes 241B.

As shown in FIG. 15A, the outer surface 241A is a surface that faces toward the second side in the third direction when the first shutter 240 is in the first posture, i.e. when the shutter 230 is in the closed state. As shown in FIG. 15C, the outer surface 241A faces upward when the first shutter 240 is in the second posture, i.e. when the shutter 230 is in the open state.

Referring back to FIG. 13A and FIG. 13B, the through holes 241B are through holes that extend through the plate-shaped portion 241 in the third direction when the shutter 230 is in the closed state. Therefore, the through holes 241B extend through the plate-shaped portion 241 in the vertical direction when the shutter 230 is in the open state.

The first side wall portion 242 is located at an end of the plate-shaped portion 241 facing toward the first side in the first direction. The first side wall portion 242 includes a hole 242A that extends through the first side wall portion 242 in the first direction. A part of the inner surface of the hole 242A is open in the third direction to render the first shutter 240 removable from a mold after the first shutter 240 is injection molded.

The hole 242A is a hole into which the boss 222 of the first opening member 220A is inserted. The first side wall portion 242 of the first shutter 240 is rotatably supported by the boss 222 of the first opening member 220A.

As shown in FIG. 13B, the second side wall portion 243 is located at an end of the plate-shaped portion 241 facing toward the second side in the first direction. The second side wall portion 243 includes a hole 243A that extends through the second side wall portion 243 in the first direction. A part of the inner surface of the hole 243A is open in the third direction to render the first shutter 240 removable from a mold after the first shutter 240 is injection molded.

The hole 243A is a hole into which the boss 222 of the second opening member 220B is inserted. The second side wall portion 243 of the first shutter 240 is rotatably supported by the boss 222 of the second opening member 220B.

The spring hooking portion 244 is a part for hooking a shutter spring 260 (which will be described below) thereto. The spring hooking portion 244 is disposed on the first side wall portion 242.

As shown in FIG. 13A, the second shutter 250 includes a plate-shaped portion 251 and two bosses 252.

The plate-shaped portion 251 is a plate-shaped part, having a dimension in the first direction greater than the dimensions in the other directions.

Figure 14:
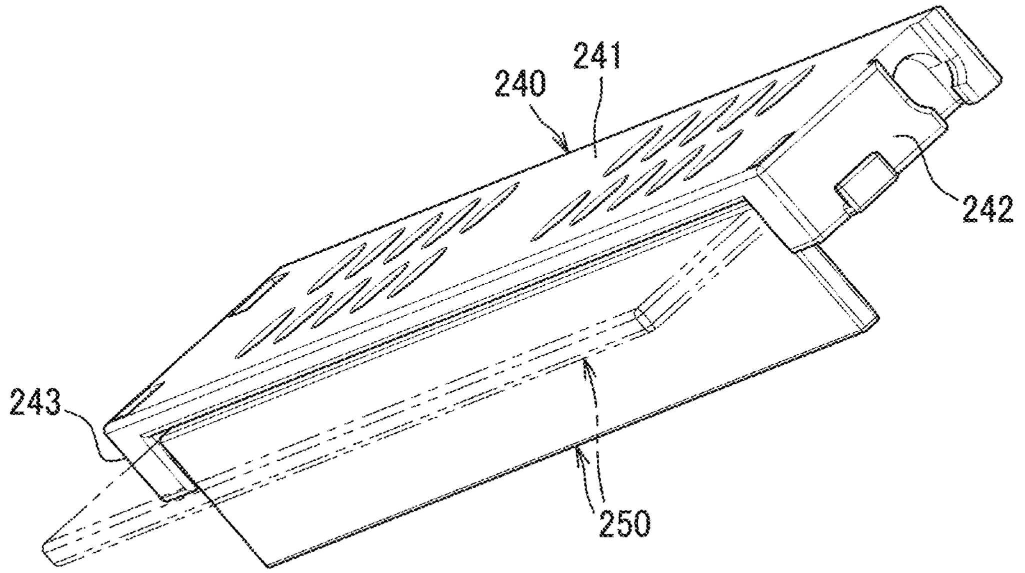
FIG. 14 is a perspective view showing a movement of a second shutter with respect to a first shutter.

One boss 252 is disposed on each of two ends of the plate-shaped portion 251 in the first direction. Each boss 252 protrudes from the plate-shaped portion 251 in the first direction. As shown in FIG. 13A and FIG. 14, the two bosses 252 are supported by the first side wall 242 and the second side wall 243 of the first shutter 240, respectively, so that the second shutter 250 is rotatable.

As shown in FIGS. 15A to 15C, the second shutter 250 is suspended from the first shutter 240. The second shutter 250 is oriented approximately in the vertical direction with its bottom end pointing downward due to gravity regardless of the posture of the first shutter 240.

As shown in FIG. 15A, the first shutter 240 is in the first posture and suspended from the opening members 220 when the opening members 220 are located in the first position. In other words, the shutter 230 is closed when the opening members 220 are located in the first position.

When the opening members 220 are located in the first position, the opposing portion 211 of the support member 210 faces the first shutter 240 in the direction of movement of the opening members 220, i.e. in the third direction. In the present embodiment, when the opening members 220 are in the first position, the opposing portion 211 is in contact with the first shutter 240. The opposing portion 211 is located apart from the rotation axis AX of the first shutter 240 in the second direction, which is perpendicular to the third direction. Specifically, the opposing portion 221 is located below the rotation axis AX.

Thereby, when the opening members 220 are caused to move from the first position to the second position, a part of the first shutter 240 below the rotation axis AX is pushed by the opposing portion 211, and the first shutter 240 is caused to rotate from the first posture to the second posture. In other words, in a process of the opening members 220 moving from the first position to the second position, the first shutter 240 is pushed by the opposing portion 211, and thereby caused to rotate so that the opening 101 of the fixing device housing 100 is opened. Therefore, as shown in FIG. 15C, the shutter 230 is open when the opening members 220 are located in the second position.

Figure 16:
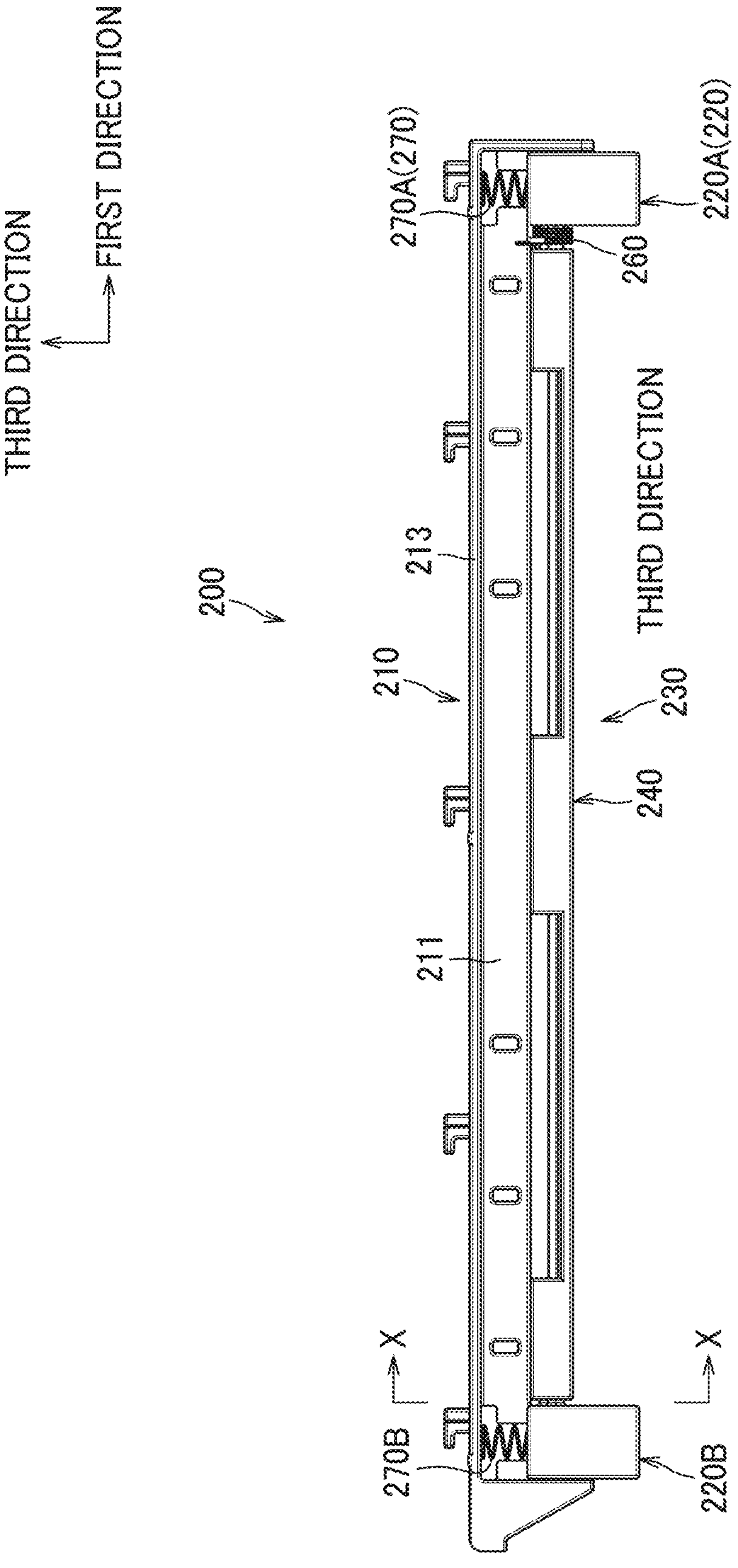
FIG. 16 is a plan view of the shutter unit as viewed from above.

As shown in FIG. 15 and FIG. 16, the shutter unit 200 further comprises a shutter spring 260 and two move springs 270.

The shutter spring 260 is a spring configured to bias the shutter 230 in such a direction as to cause the shutter 230 to close the opening 101. In the present embodiment, the shutter spring 260 is a torsion spring. The shutter spring 260 biases the first shutter 240 in such a direction as to cause the first shutter 240 to rotate from the second posture to the first posture.

As shown in FIG. 16, the shutter spring 260 is located between the first shutter 240 and the first opening member 220A. As shown in FIGS. 15A to 15C, one end of the shutter spring 260 is hooked to the spring hooking portion 224 of the first opening member 220A.

The other end of the shutter spring 260 is hooked to the spring hooking portion 244 of the first shutter 240. The boss 222 of the first opening member 220A is inserted into the coil portion of the shutter spring 260 and supports the coil portion. The shutter spring 260 is configured to bias the first shutter 240 in the clockwise direction of FIGS. 15A to 15C, such that the first shutter 240 is caused to move from the second posture shown in FIG. 15C toward the first posture shown in FIG. 15A.

As shown in FIG. 16, the move springs 270 are springs each configured to bias the corresponding opening member 220 from the second position toward the first position. In the present embodiment, each move spring 270 is a helical compression spring.

In the following descriptions, the move spring 270 configured to bias the first opening member 220A is also referred to as first move spring 270A, and the move spring 270 configured to bias the second opening member 220B will also be referred to as second move spring 270B.

The first move spring 270A is located between the first wall 213 of the support member 210 and the first opening member 220A. The second move spring 270B is located between the first wall 213 of the support member 210 and the second opening member 220B.

In the process of installing the fixing device 80 into the main housing 10, the opening members 220 move from the first position to the second position by contacting and being pushed by the shaft 16, see FIG. 15A, FIG. 15B, FIG. 15C in this sequence. Since the notches FM3 are formed in the film FM at positions corresponding to the opening members 220, the two opening members 220 pass through the notches FM3 and contact the shaft 16 without contacting the film FM. In the process in which the opening members 220 are moved from the first position to the second position, the first shutter 240 rotates from the first posture to the second posture. In other words, the opening members 220 open the shutter 230 by contacting and being pushed by the shaft 16.

Figure 17:
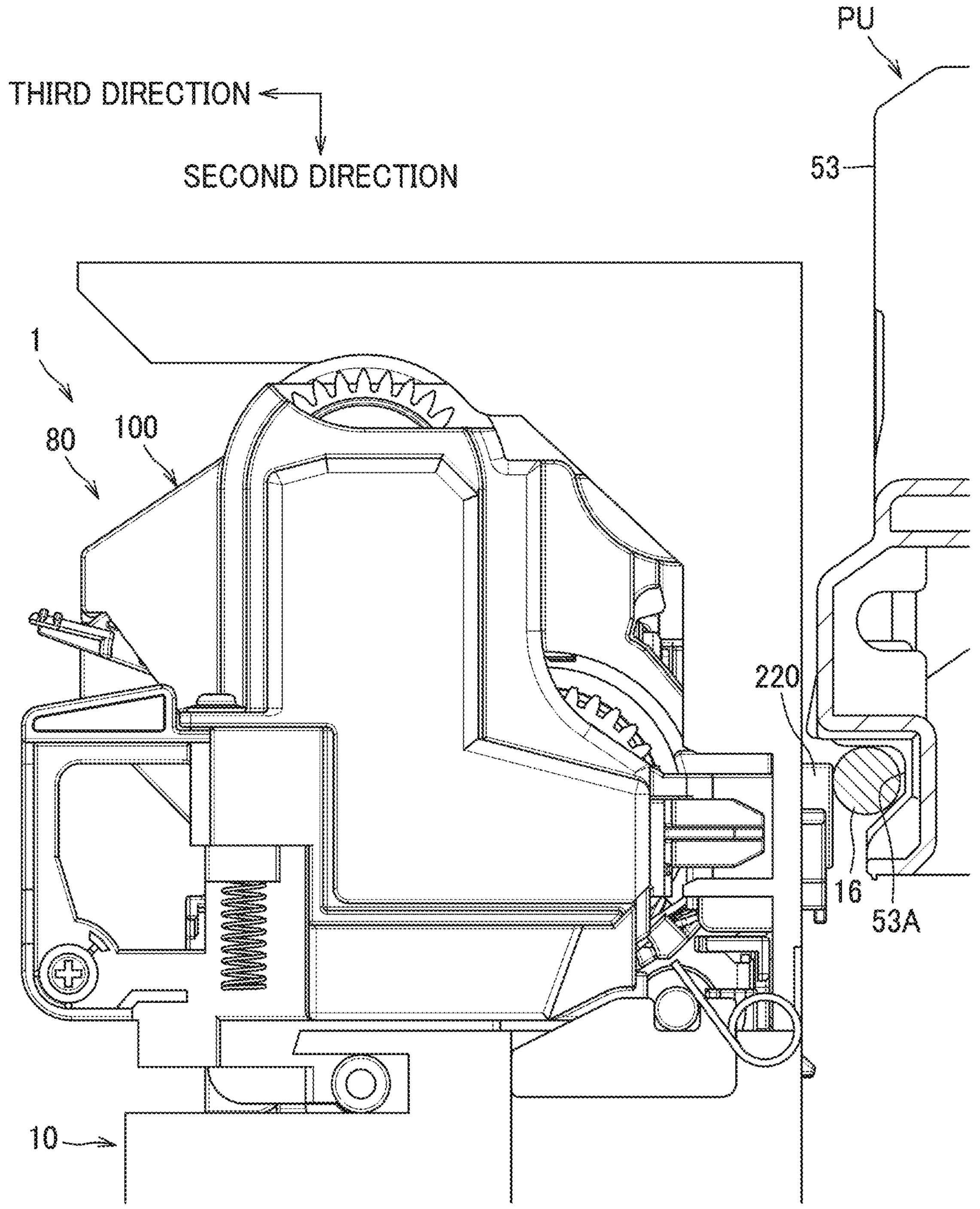
FIG. 17 is an illustration showing a relationship between a shaft, a process unit, and the fixing device.

As shown in FIG. 17, in a state where the fixing device 80 is installed in the main housing 10, the shaft 16 is in contact with the opening members 220. The shaft 16 in contact with the opening members 220 receives the biasing force of the move springs 270. The shaft 16 contacts the opening members 220 and thereby retains the opening members 220 in the second position. At this time, the move springs 270 bias the opening members 220 toward the second side in the third direction.

In the process of removing the fixing device 80 from the main housing 10, the opening members 220 move in a direction away from the shaft 16, and thereby move from the second position to the first position by the biasing force of the move springs 270, see FIG. 15C, FIG. 15B, and FIG. 15A in this sequence. In the process of the opening members 220 moving from the second position to the first position, the first shutter 240 is caused to rotate from the second posture to the first posture by the biasing force of the shutter spring 260. The opening members 220 close the shutter 230 by moving from the second position to the first position in a state where the opening members 220 are in contact with the shaft 16.

In the state where the fixing device 80 is installed in the main housing 10, a part of the film FM is located at a position corresponding to a position of the shutter, as viewed in the third direction. When the shutter 230 rotates from the closed state shown in FIG. 15A to the open state shown in FIG. 15C, the shutter 230 contacts and pushes the film FM toward the second side in the third direction, i.e., an upstream side in the direction of conveyance of the sheet S.

According to the above, the following advantageous effects can be obtained by the present embodiment.

The film FM is elastically deformable; thus, the when the fixing device 80 and the film FM contact each other, the fixing device 80 can be placed in the proper position by the film FM elastically deforming. Therefore, there is no need to unnecessarily increase the distance between the film FM and the fixing device 80.

The film FM is elastically deformed by the shutter 230; thus, the image forming apparatus 1 can be reduced in size in the direction of conveyance of the sheet S compared to an alternative configuration in which the film FM and the shutter 230 are arranged apart from each other.

The film FM is located below the housing connector 300; thus, heat can be restrained from being transferred from the fixing device 80 to the housing connector 300.

The bottom edge FM2 of the film FM is located below the development roller 61; thus, heat can be restrained from being transferred from the fixing device 80 to the development roller 61.

The film FM is clamped between the first frame 17A and the second frame 17B; thus, the upper end portion of the film FM can be held without the film FM flapping around.

The film FM has the notches FM3 in positions corresponding to the opening members 220; thus, the opening members 220 can securely contact the shaft 16.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Although the spring 450 is a helical compression spring in the above-described embodiment, the spring 450 may be a wire spring, a leaf spring, and the like.

The rotatable heating body is not limited to a heating roller, and may, for example, be a ceramic heater, or a configuration comprising a belt, a nip board contacting the inner periphery of the belt, and a heating source that heats the belt and the nip board.

The rotatable pressure body is not limited to the pressure roller, and may, for example, be a configuration comprising a belt and a rubber pad positioned inside of the belt.

Although a halogen heater is given as an example of the heater H in the above-described embodiment, the heater H may be a resistive heating element or an IH (induction heating) heat source and the like. Here, the IH heat source is a heat source that does not heat up itself, but heats the roller or the belt by magnetic induction heating.

The image forming apparatus may comprise one opening member, or more than two opening members. When the image forming apparatus comprises one opening member, the opening member may be located at the central portion of the shutter along the length in the first direction.

When the opening members are located in the first position, the opening members may not protrude from the outer surface of the fixing device housing. When the opening members are located in the second position, the opening members may or may not protrude from the outer surface of the fixing device housing.

The film may not have the notches at the positions corresponding to the opening members. In this case, the film may be held between the shaft and the opening member when the opening members contact the shaft.

The shutter may open and close in synchronization with the opening and closing of the cover of the main housing. For example, an interlocking mechanism that moves in synchronization with the opening and closing of the cover may be configured to push the opening member from the first position to the second position.

The elements described in the above example embodiment and its modifications may be implemented selectively and in combination.

What is claimed is:

1. An image forming apparatus, comprising:

a main housing;

a process unit configured to form a toner image on a sheet that is conveyed through the process unit and comprising a cartridge containing toner;

a fixing device located downstream of the process unit in a direction of conveyance of the sheet and comprising a rotatable heating body and a rotatable pressure body, the rotatable heating body and the rotatable pressure body nipping and applying heat and pressure to the sheet on which the toner image is formed to fix the toner image on the sheet; and an elastically deformable film with an upper end attached to the main housing at a position between the fixing device and the process unit, the elastically deformable film extending downward from a position above an area through which the sheet is conveyed.

2. The image forming apparatus according to claim 1, wherein the film extends further outward of an area through which a sheet having a maximum size on which an image is formable in the image forming apparatus is conveyed, in a width direction perpendicular to the direction of conveyance of the sheet.

3. The image forming apparatus according to claim 1, wherein the fixing device comprises a heating source extending in a width direction perpendicular to the direction of conveyance of the sheet, and the film extends further outward of an area in which the heating source is located, in a width direction perpendicular to the direction of conveyance of the sheet.

4. The image forming apparatus according to claim 1, wherein the fixing device comprises a shutter and an opening through which the sheet enters the fixing device, the shutter configured to move between a closed state in which the opening is covered and an open state in which the opening is uncovered, and a bottom edge of the film is located below a top edge of the shutter in the open state and above a bottom edge of the shutter in the open state.

5. The image forming apparatus according to claim 4, wherein the shutter is configured to:

rotate when moving from the closed state to the open state; and contact and push the film toward an upstream side in the direction of conveyance of the sheet when rotating from the closed state to the open state.

6. The image forming apparatus according to claim 1, wherein the rotatable heating body comprises a roller that is configured to contact the sheet, and the film extends further outward of an area in which the roller is located, in a width direction perpendicular to the direction of conveyance of the sheet.

7. The image forming apparatus according to claim 1, wherein the process unit comprises a drawer in which the cartridge is installable into and removable from, the drawer being installable into and removable from the main housing, the main housing comprises a shaft configured to be engaged with the drawer, and a bottom edge of the film is located below the shaft.

8. The image forming apparatus according to claim 7, wherein the drawer comprises a first connector comprising a first electrical contact and a spring biasing the first electrical contact, the main housing comprises a second connector comprising a second electrical contact configured to contact the first connector, the second connector configured to be connected with the first connector with the spring in a deformed state, and the film is located below the second connector.

9. The image forming apparatus according to claim 1, wherein the process unit comprises a photosensitive drum and a development roller that supplies toner to the photosensitive drum, and a bottom edge of the film is located below the development roller.

10. The image forming apparatus according to claim 1, wherein the main housing comprises:

a first frame located above the fixing device; and a second frame configured to be assembled onto the first frame, and the second frame comprises a hook to which the film is hooked, and the film is clamped between the first frame and the second frame.

11. The image forming apparatus according to claim 10, wherein the first frame supports an ejection roller located downstream of the fixing device in the direction of conveyance of the sheet, the ejection roller configured to eject the sheet outside the main housing.

12. The image forming apparatus according to claim 10, wherein the process unit comprises a drawer in which the cartridge is installable into and removable from, the drawer being installable into and removable from the main housing, the main housing comprises a shaft engageable with the drawer, the first frame comprises an engaging portion configured to be engaged with the shaft, and the film is located between the engaging portion and the fixing device.

13. The image forming apparatus according to claim 12, wherein the fixing device comprises:

a shutter configured to cover and uncover an opening through which the sheet enters the fixing device; and an opening member configured to open the shutter by contacting the shaft, and the film includes a notch at a position corresponding to the opening member.

14. The image forming apparatus according to claim 1, wherein the rotatable heating body and the rotatable pressure body form a fixing nip that nips the sheet, the process unit comprises a photosensitive drum and a transfer roller, forming a drum transfer nip that nips the sheet, and a bottom edge of the film is located above a straight line connecting the fixing nip and the drum transfer nip, as viewed in a width direction perpendicular to the direction of conveyance of the sheet.

* * * * *